(12) United States Patent
Saito et al.

(10) Patent No.: US 10,245,676 B2
(45) Date of Patent: Apr. 2, 2019

(54) FRICTION STIR WELDING DEVICE

(71) Applicant: IHI Corporation, Tokyo (JP)

(72) Inventors: Hiroshi Saito, Tokyo (JP); Kunitaka Masaki, Tokyo (JP); Koji Nezaki, Tokyo (JP); Tadafumi Kanayama, Tokyo (JP); Satoshi Yamanaka, Tokyo (JP); Yasushi Tabei, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 15/642,122

(22) Filed: Jul. 5, 2017

(65) Prior Publication Data
US 2017/0297143 A1    Oct. 19, 2017

Related U.S. Application Data

(63) Continuation of application No. PCT/JP2016/050490, filed on Jan. 8, 2016.

(30) Foreign Application Priority Data

Jan. 9, 2015    (JP) ................................. 2015-002999

(51) Int. Cl.
*B23K 20/12*    (2006.01)
*B23K 101/28*    (2006.01)

(52) U.S. Cl.
CPC ........ *B23K 20/1255* (2013.01); *B23K 20/125* (2013.01); *B23K 20/126* (2013.01); *B23K 20/128* (2013.01); *B23K 20/129* (2013.01); *B23K 20/1245* (2013.01); *B23K 20/1265* (2013.01); *B23K 2101/28* (2018.08)

(58) Field of Classification Search
CPC ................. B23K 20/12; B23K 20/122–20/128
USPC ................................................. 228/112.1, 2.1
See application file for complete search history.

(56) References Cited

U.S. PATENT DOCUMENTS

| 5,971,247 A | * | 10/1999 | Gentry | ................. B23K 20/126 |
| | | | | 156/580 |
| 6,419,142 B1 | * | 7/2002 | Larsson | ............... B23K 20/126 |
| | | | | 228/112.1 |

(Continued)

FOREIGN PATENT DOCUMENTS

| CA | 2926542 A1 | * | 5/2015 | ......... B23K 20/1255 |
| EP | 2067563 A1 | * | 6/2009 | ........... B23K 20/122 |

(Continued)

OTHER PUBLICATIONS

Fukuda et al., "Development situation and patent information of latest FSW process of TWI," Special topic, Dodwell B.M.S Ltd., 2011, vol. 59, No. 6, pp. 57-60 (7 pages) (with English translation).

*Primary Examiner* — Kiley S Stoner
(74) *Attorney, Agent, or Firm* — Rothwell, Figg, Ernst & Manbeck, P.C.

(57) ABSTRACT

In the present disclosure, friction stir welding tools having probes and stationary shoulders are disposed at corners between a first workpiece and a second workpiece. A welding device main body includes axially perpendicular movement units for moving spindle units, which hold the respective friction stir welding tools on a frame, in directions perpendicular to rotary shafts of probes, and axial movement units for moving the spindle units in directions parallel to the rotary shafts of the probes.

3 Claims, 17 Drawing Sheets

(56) References Cited

U.S. PATENT DOCUMENTS

| | | | | |
|---|---|---|---|---|
| 8,857,696 B1* | 10/2014 | Merah | ............... | B23K 20/1255 228/112.1 |
| 9,010,613 B1* | 4/2015 | Matlack | ............. | B23K 20/1225 228/112.1 |
| 2002/0070259 A1* | 6/2002 | Crasser | ............... | B23K 20/129 228/2.1 |
| 2002/0190100 A1* | 12/2002 | Duncan, Jr. | .......... | B23K 20/125 228/112.1 |
| 2004/0134971 A1* | 7/2004 | Narita | ................. | B23K 20/122 228/112.1 |
| 2006/0102699 A1* | 5/2006 | Burton | ................ | B23K 20/123 228/112.1 |
| 2010/0006622 A1* | 1/2010 | Smith | ................. | B23K 20/125 228/2.1 |
| 2010/0072261 A1* | 3/2010 | Cruz | .................... | B23K 20/123 228/102 |
| 2012/0193401 A1* | 8/2012 | Hori | ................... | B23K 20/1265 228/112.1 |
| 2012/0228272 A1* | 9/2012 | Carlson | ............. | H02K 15/0012 219/75 |
| 2015/0209895 A1* | 7/2015 | Matlack | ............. | B23K 20/1225 228/2.1 |
| 2016/0263696 A1* | 9/2016 | Nishida | ............... | B23K 20/1255 |
| 2018/0071861 A1* | 3/2018 | Masaki | ................ | B23K 20/128 |

FOREIGN PATENT DOCUMENTS

| | | | | | |
|---|---|---|---|---|---|
| JP | 11320128 | A | * | 11/1999 | |
| JP | 2000-153375 | A | | 6/2000 | |
| JP | 2001-321965 | A | | 11/2001 | |
| JP | 2001321965 | A | * | 11/2001 | |
| JP | 2003094263 | A | * | 4/2003 | |
| JP | 2003-326375 | A | | 11/2003 | |
| JP | 2011079031 | A | * | 4/2011 | ......... B23K 20/1265 |
| JP | 2011-200880 | A | | 10/2011 | |
| JP | 2011-206786 | A | | 10/2011 | |
| JP | 2013-166159 | A | | 8/2013 | |
| JP | 2013166159 | A | * | 8/2013 | |
| JP | 2013-202628 | A | | 10/2013 | |
| JP | 2013-202629 | A | | 10/2013 | |
| JP | 2013-202630 | A | | 10/2013 | |
| JP | 2015085382 | A | * | 5/2015 | ......... B23K 20/1255 |

\* cited by examiner

FRICTION STIR WELDING DEVICE

CROSS-REFERENCE TO RELATED APPLICATION

This application is a Continuous application based on International Application No. PCT/JP2016/050490, filed Jan. 8, 2016, which claims priority to Japanese Patent Application No. 2015-002999, filed on Jan. 9, 2015, the contents of which are incorporated herein by reference.

TECHNICAL FIELD

The present disclosure relates to a friction stir welding device used to weld corners of workpieces to be welded.

BACKGROUND ART

A type of friction stir welding tool having a rotary shoulder rotated integrally with a probe and a type of friction stir welding tool having a rotary probe and a stationary shoulder that is not rotated are known as friction stir welding tools (tools for friction stir welding) used in a friction stir welding device.

As the friction stir welding tool having the stationary shoulder, a type of friction stir welding tool in which the stationary shoulder has a face that comes into contact with both workpiece surfaces forming corners for the purpose of performing friction stir welding on corners (inner corners) of the workpieces to be welded is known.

Further, a device for performing friction stir welding on two corners, which are formed by abutting a horizontal workpiece (a horizontal member) and a workpiece (an erected member) erected on the horizontal workpiece from opposite sides of the erected workpiece using a pair of friction stir welding tools (for example, see Patent Document 1) has been conventionally proposed as the friction stir welding device using the above-mentioned friction stir welding tool for welding the corners.

This friction stir welding device includes a pressing mechanism for applying a pressing load to each of the friction stir welding tools. This pressing mechanism is configured to have an upward/downward moving means and a leftward/rightward moving means. In addition, the pressing mechanism controls outputs of both the upward/downward moving means and the leftward/rightward moving means in order to equalize directions of both a vector direction of the pressing load applied to the friction stir welding tool and a direction of the central axis of a probe, which is a stir shaft.

Further, when friction stir welding of the corners is performed by the friction stir welding tool having the stationary shoulder, a method called AdStir configured to form R (a fillet caused by buildup) at the welded corners by adding a welding filler has also been conventionally proposed (for example, see Non-Patent Document 1).

Meanwhile, in the friction stir welding using a type of friction stir welding tool having the rotary shoulder, frictional heat can be generated at a place at which the rotary shoulder is in contact with the workpiece.

In contrast, in the friction stir welding using a type of friction stir welding tool having the stationary shoulder, since no frictional heat occurs at a place at which the stationary shoulder is in contact with the workpiece, the frictional heat needs to be generated at the workpiece only by the rotary probe.

For this reason, when the type of friction stir welding tool having the stationary shoulder is used, it is important to control a pressing load (a pressing force) applied to the friction stir welding tool.

DOCUMENT OF RELATED ART

Patent Document 1

Japanese Unexamined Patent Application, First Publication No. 2013-166159

Non-Patent Document 1

Fukuda Tetsuo, Takao Kakuhari, "Up-to-date FSW process development situation and patent information of TWI," Welding Technology, Sanpo Publications, Inc., June 2011, Vol. 59, No. 6, pp 57-60

SUMMARY

Technical Problem

Meanwhile, when friction stir welding of corners of workpieces is performed, a deviation in positions of the corners, for instance, may occur due to an error in manufacturing accuracy of each of the workpieces, an error in shape, such as warpage, of each of the workpieces, or the like. When this positional deviation of the corners occurs, it is necessary to adjust positions of friction stir welding tools to follow a change in the positions of the corners.

In the friction stir welding device disclosed in Patent Document 1, adjustment of the position of each of friction stir welding tools depending on a pressing mechanism needs to be performed by an upward/downward moving means and a leftward/rightward moving means. However, the upward/downward moving means and the leftward/rightward moving means are subject to control of an output for equalizing directions of both a vector direction of a pressing load applied to the friction stir welding tool and a direction of a central axis of a probe, which is a stir shaft, during an operation of the friction stir welding.

For this reason, in the friction stir welding device disclosed in Patent Document 1, when adjusting the position of each friction stir welding tool that follows a change in a position of each corner and controlling the vector direction of the pressing load of the friction stir welding tool against the corner are simultaneously performed, it is difficult to enhance controllability of the pressing load.

In Non-Patent Document 1, an idea for enhancing the controllability of a pressing load of a friction stir welding tool is not shown.

Therefore, the present disclosure provides a friction stir welding device capable of improving controllability of a pressing load applied to each friction stir welding tool when friction stir welding of two corners of workpieces is performed using a pair of friction stir welding tools having stationary shoulders.

Solution to Problem

A first aspect of the present disclosure is a friction stir welding device that includes: a workpiece holder configured to hold a first workpiece and a second workpiece whose end edge is abutted and disposed in a posture of making an angle intersecting a face of the first workpiece; and a welding device main body configured to be relatively moved in directions in which corners formed by the first and second workpieces held by the workpiece holder extend, wherein the welding device main body includes: friction stir welding tools including stationary shoulders, which have workpiece contact faces brought into contact with both of the workpieces forming the corners, and rotatable probes and disposed at both the corners between which the second workpiece is sandwiched; spindle units configured to rotate the probes of the friction stir welding tools; axial movement units configured to move the spindle units in directions following rotary shafts of the probes within a plane perpendicular to a direction of relative movement of the welding device main body relative to the workpieces; and axially perpendicular movement units configured to move the spindle units in directions perpendicular to the rotary shafts of the probes within the plane perpendicular to the direction of relative movement.

Effects

According to the friction stir welding device of the present disclosure, when friction stir welding is performed along two corners of workpieces using a pair of friction stir welding tools having stationary shoulders, controllability of a pressing load applied to each of the friction stir welding tools can be improved.

DESCRIPTION OF EMBODIMENTS

A friction stir welding device of the present disclosure will be described with reference to the drawings.

First Embodiment

Figure 1:
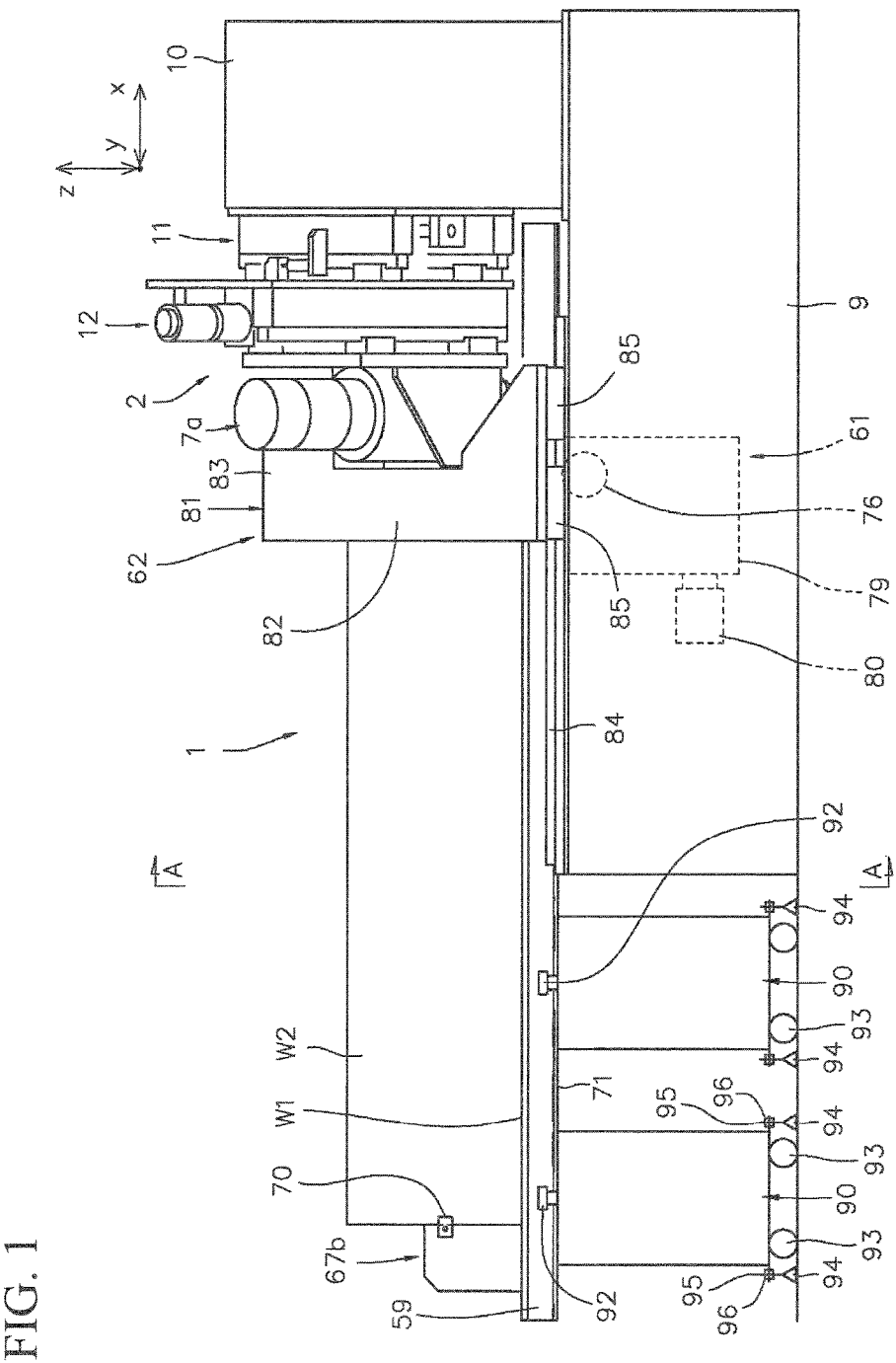
FIG. 1 is a schematic side view showing a first embodiment of a friction stir welding device.
Figure 2:
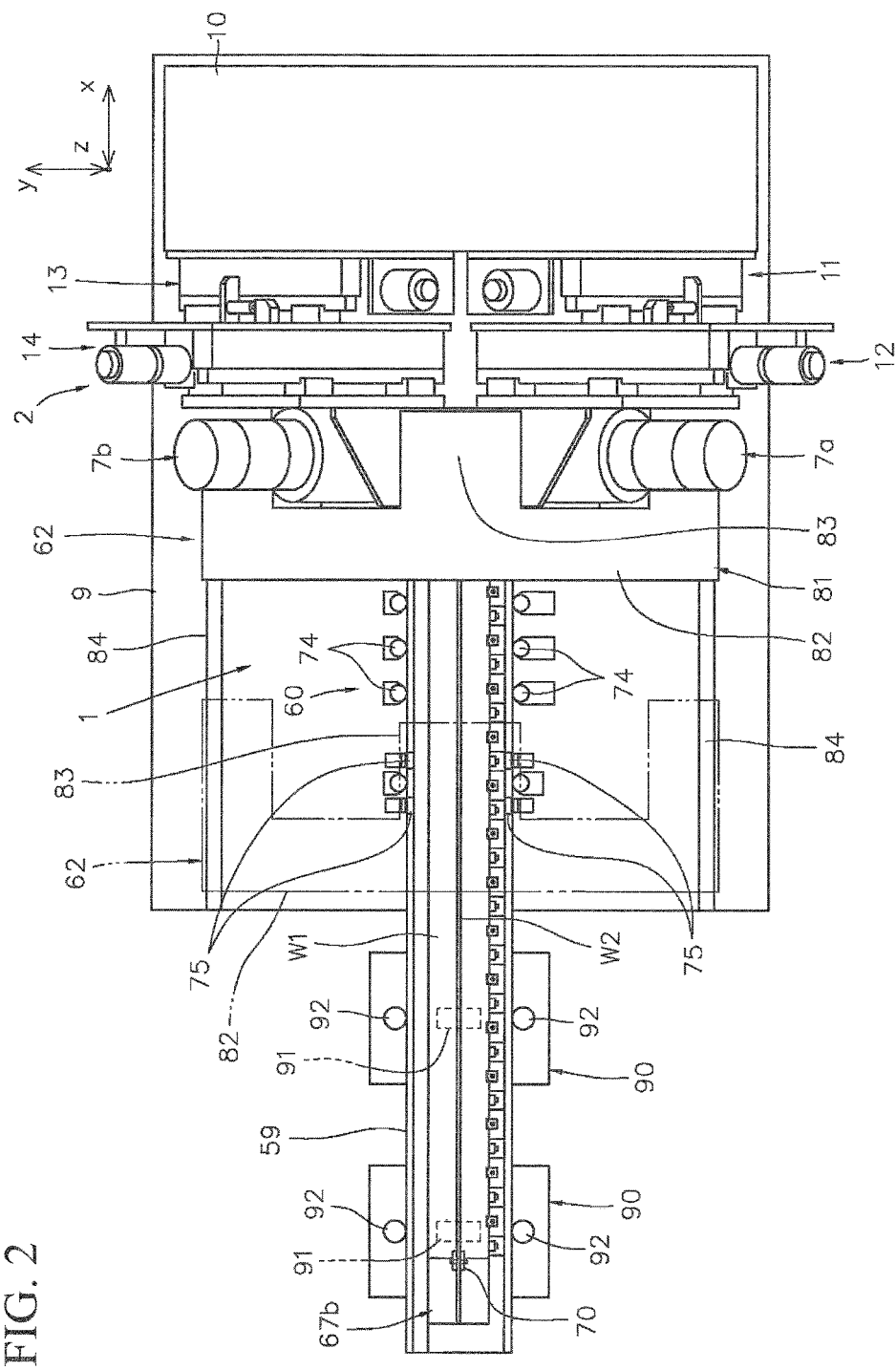
FIG. 2 is a schematic top view of the first embodiment.
Figure 3:
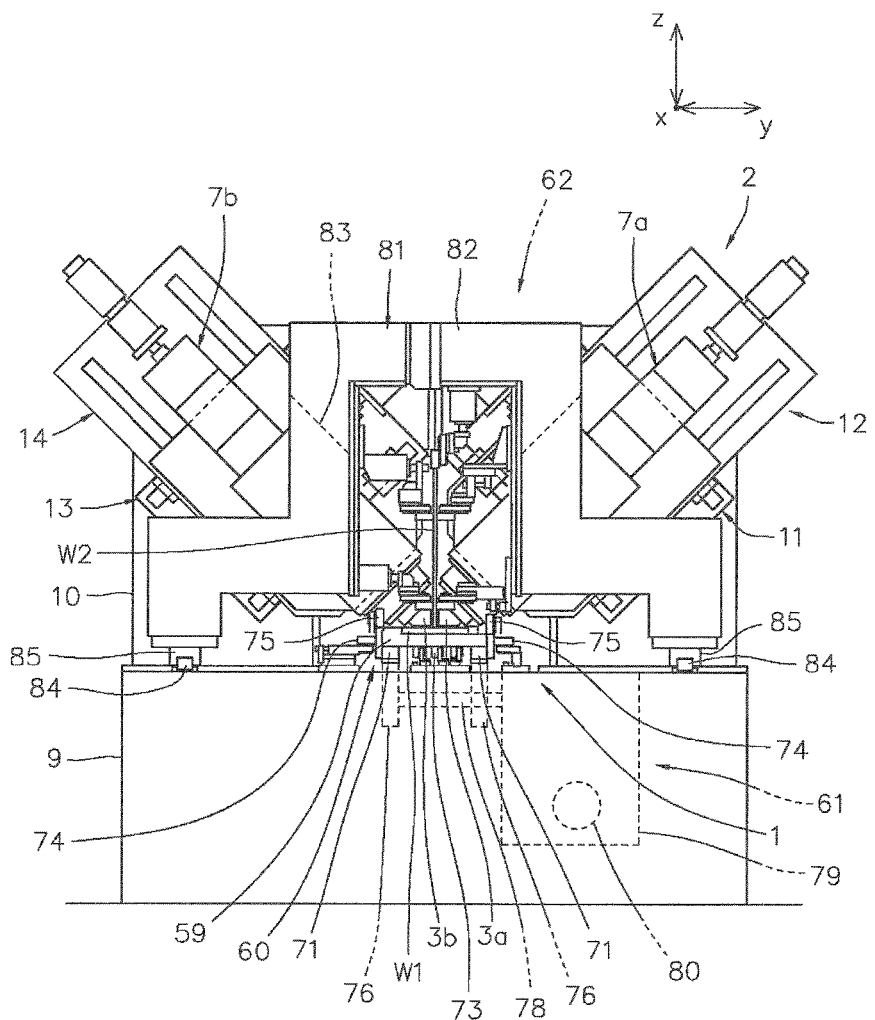
FIG. 3 is a view taken in the directions of arrows A-A of FIG. 1.
Figure 4A:
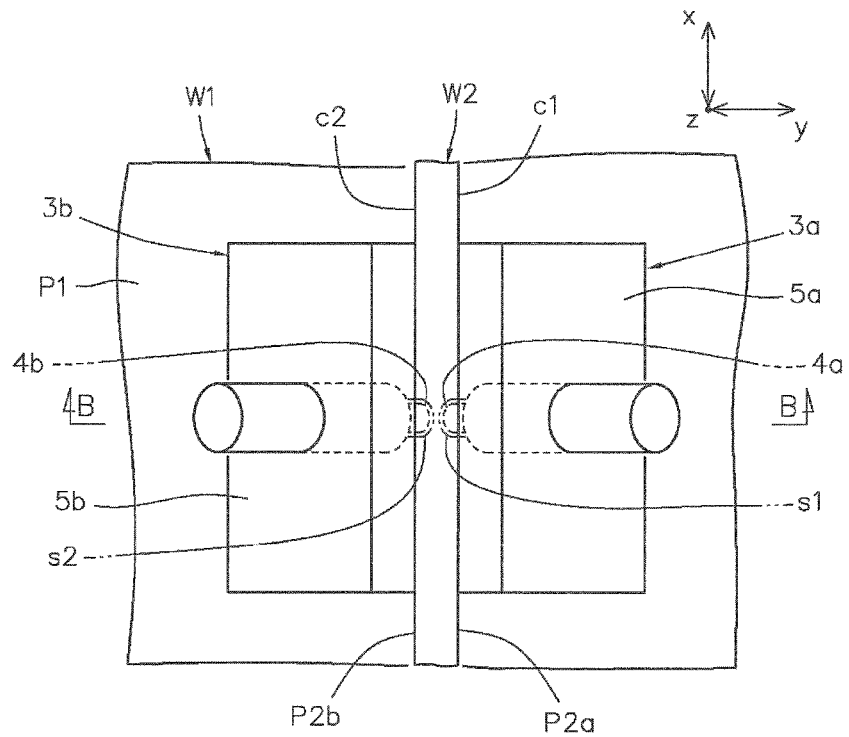
FIG. 4A is an enlarged top view showing portions of friction stir welding tools in the first embodiment.
Figure 4B:
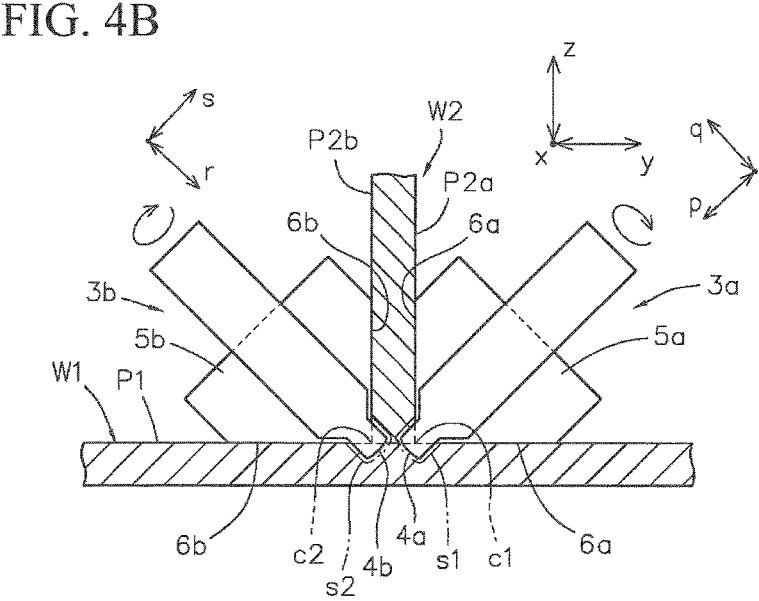
FIG. 4B is an enlarged view that showing the portions of the friction stir welding tools in the first embodiment and is taken in the directions of arrows B-B of FIG. 4A.
Figure 5:
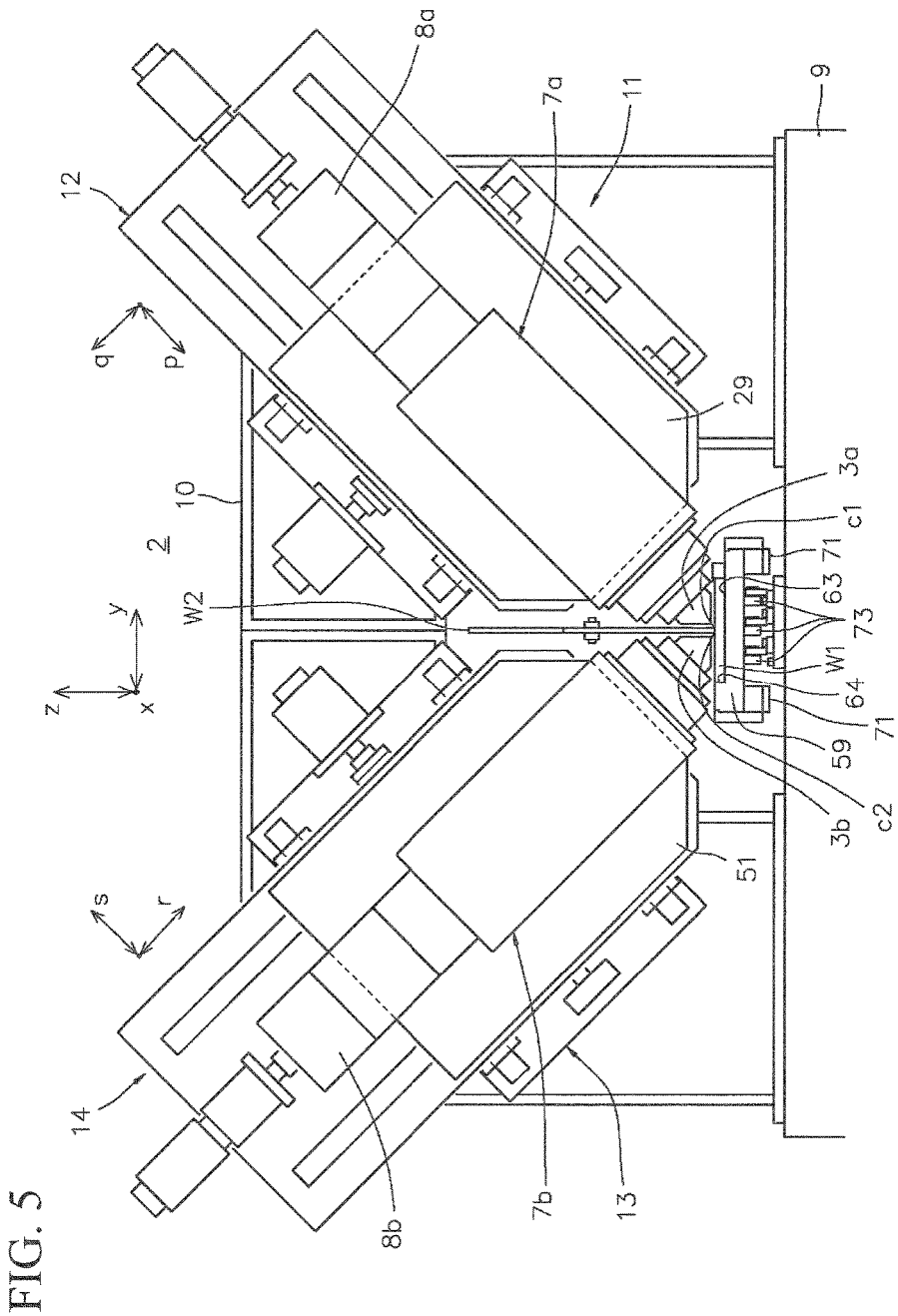
FIG. 5 is an enlarged view of a welding device main body in the first embodiment when viewed from the front in an advancing direction.
Figure 6:
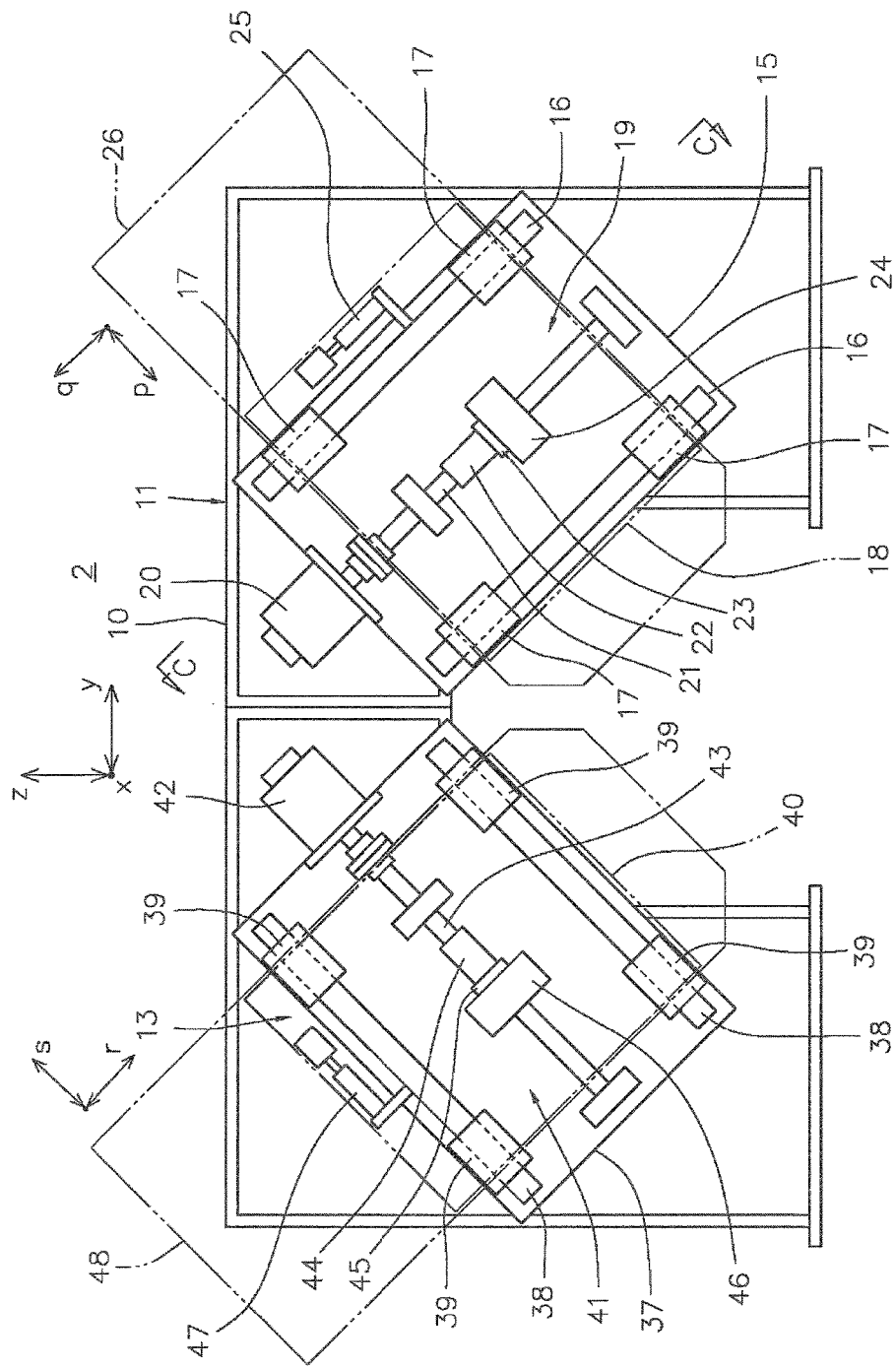
FIG. 6 is a partial sectional view showing axially perpendicular movement units of the welding device main body.
Figure 7:
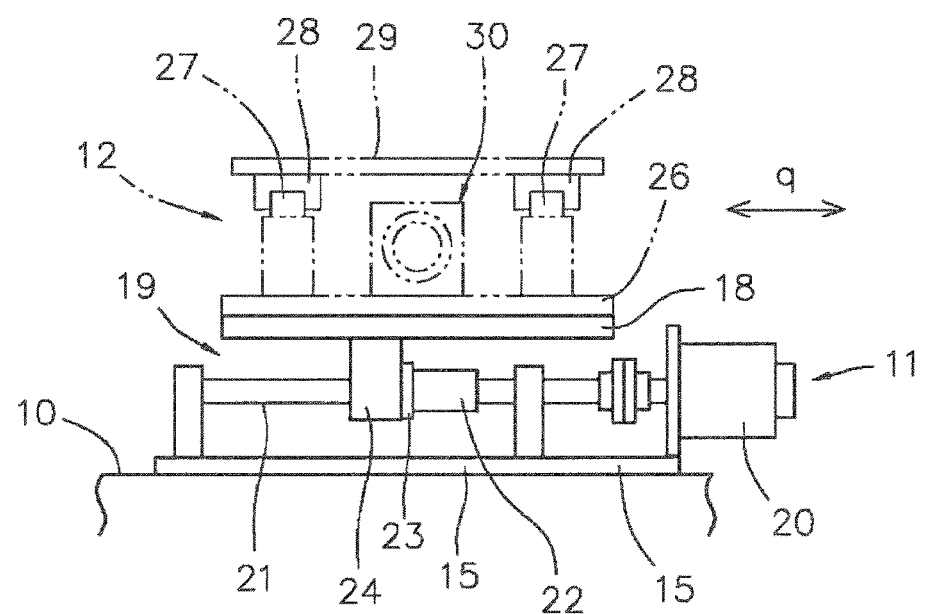
FIG. 7 is a view taken in the directions of arrows C-C of FIG. 6.
Figure 8:
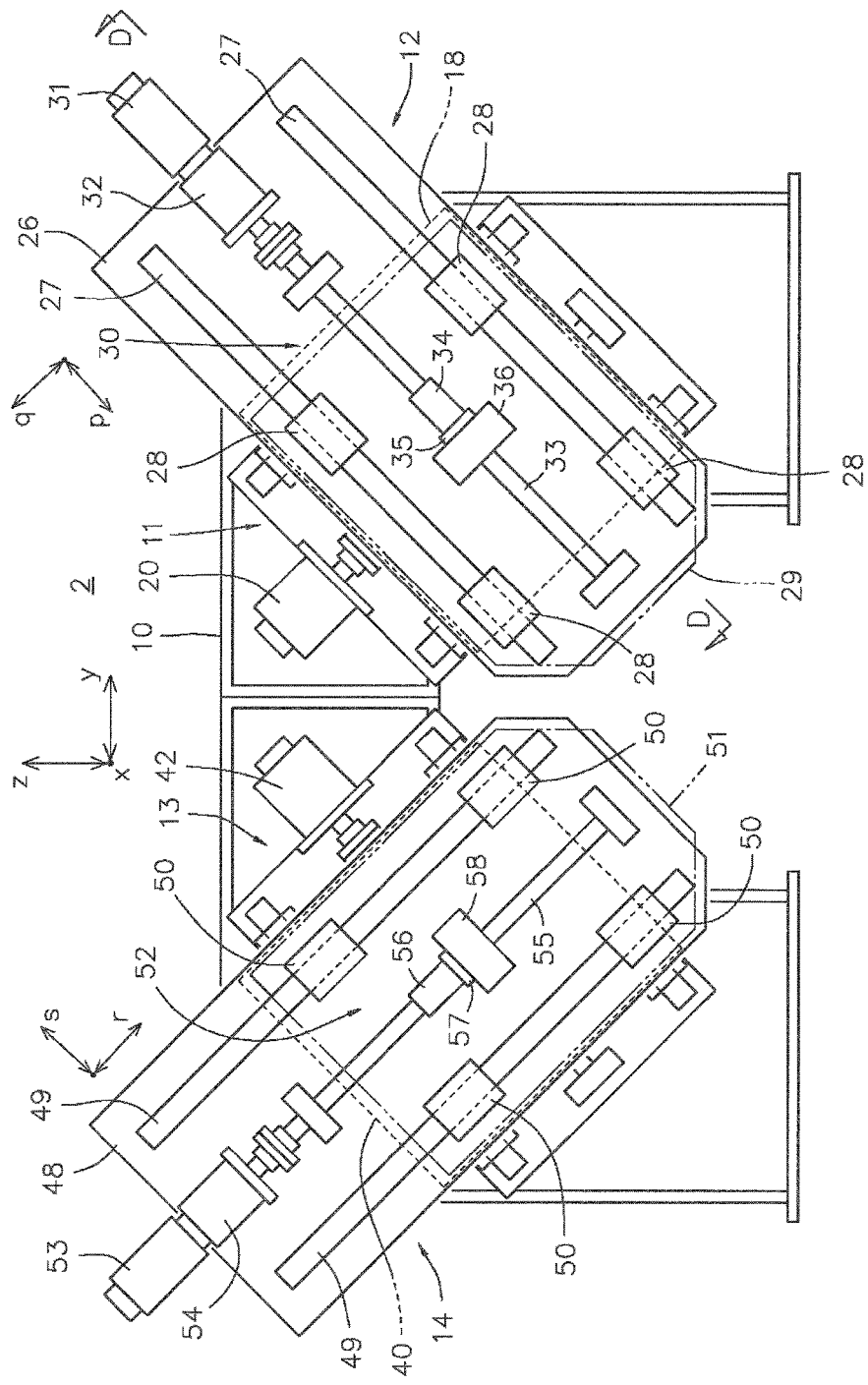
FIG. 8 is a partial sectional view showing axial movement units of the welding device main body.
Figure 9:
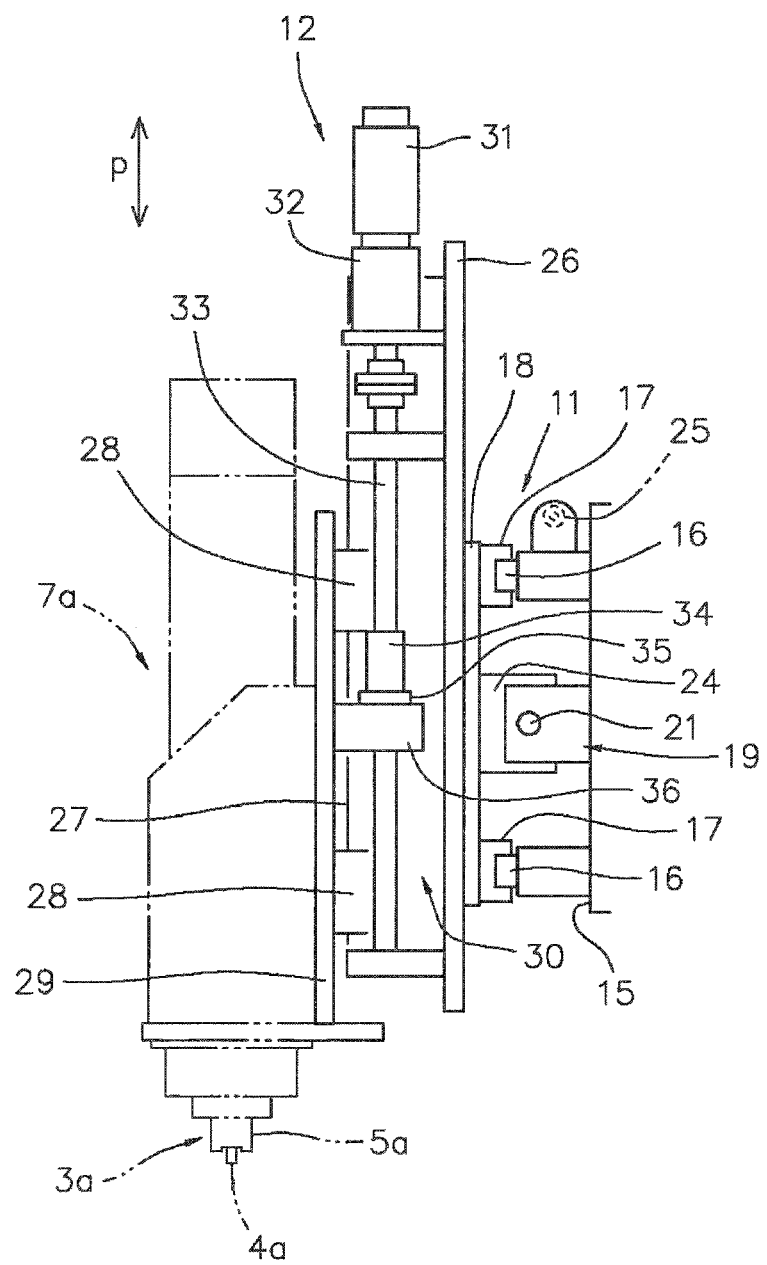
FIG. 9 is a view taken in the directions of arrows D-D of FIG. 8.
Figure 10:
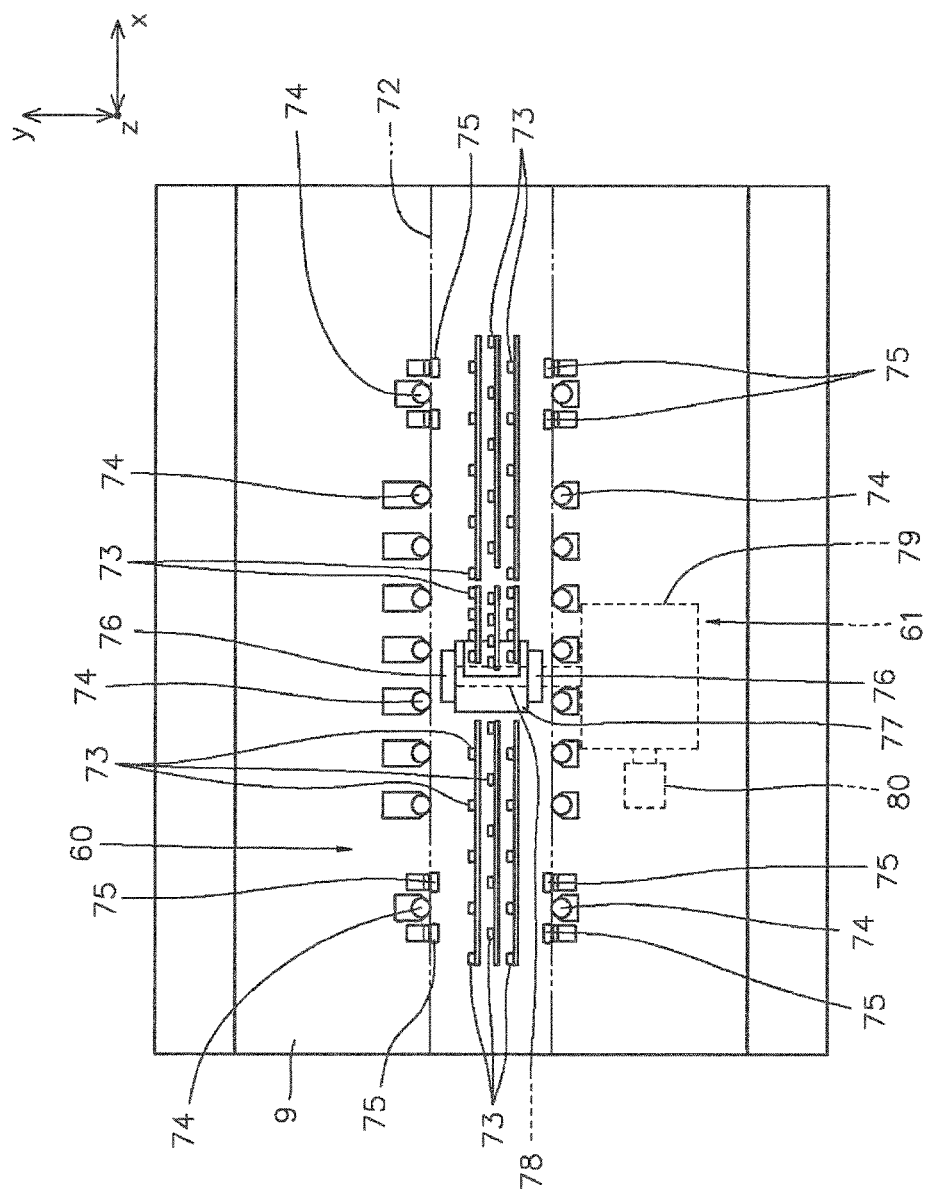
FIG. 10 is a schematic top view showing a workpiece holder in the first embodiment.
Figure 11A:
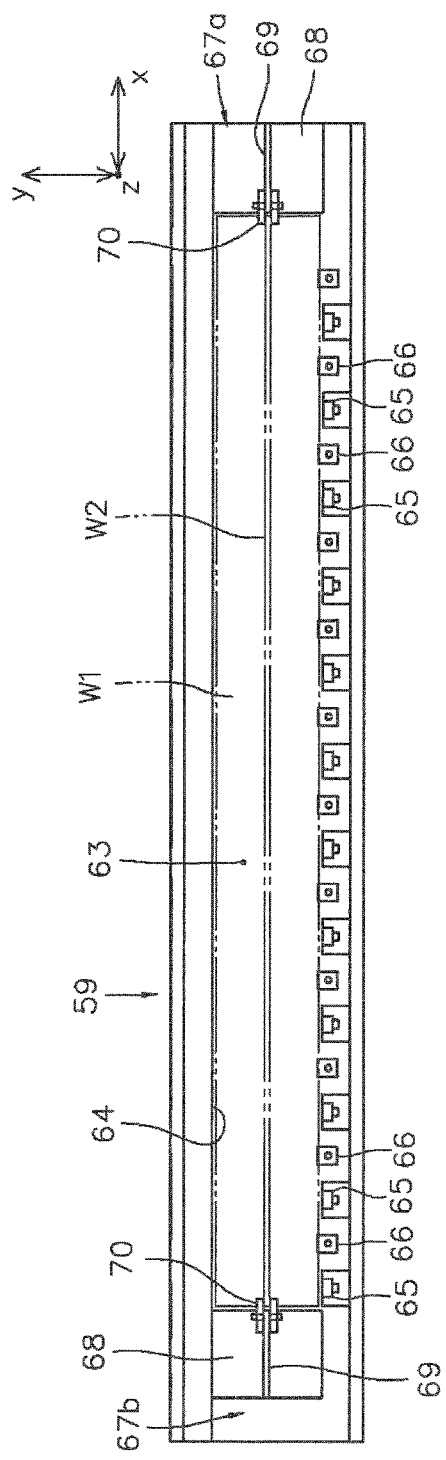
FIG. 11A is an enlarged top view showing a workpiece table of the workpiece holder.
Figure 11B:
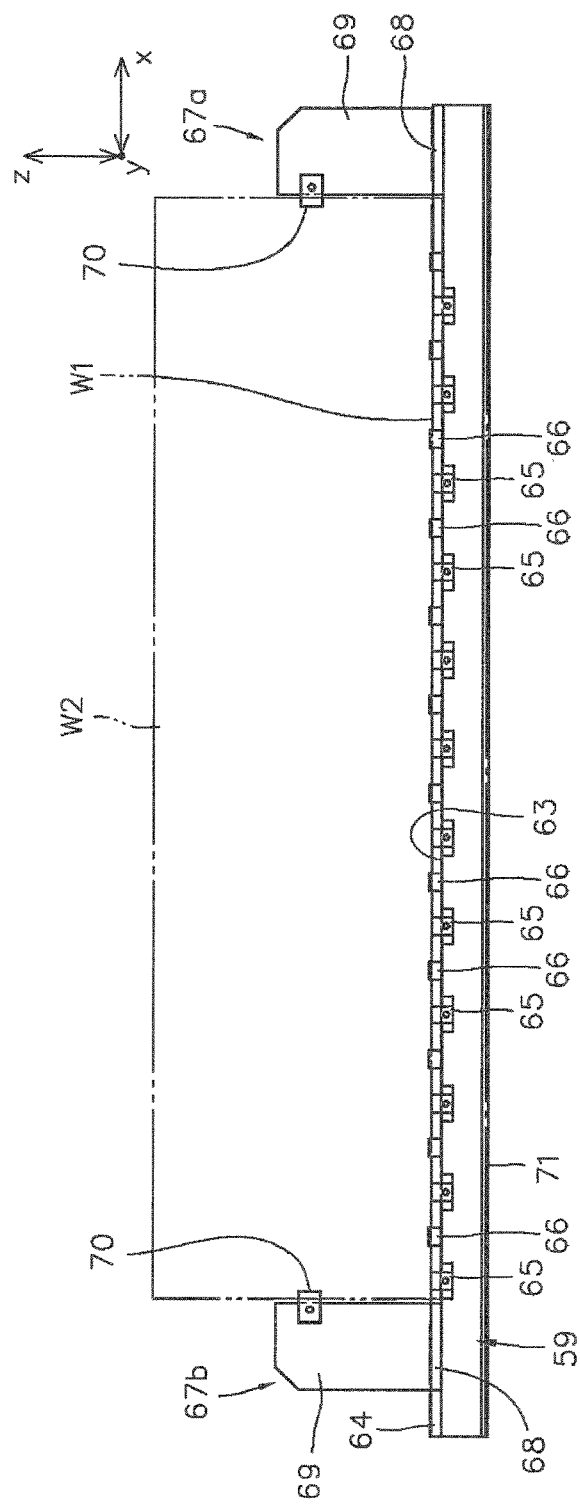
FIG. 11B is an enlarged side view showing the workpiece table of the workpiece holder.
Figure 12:
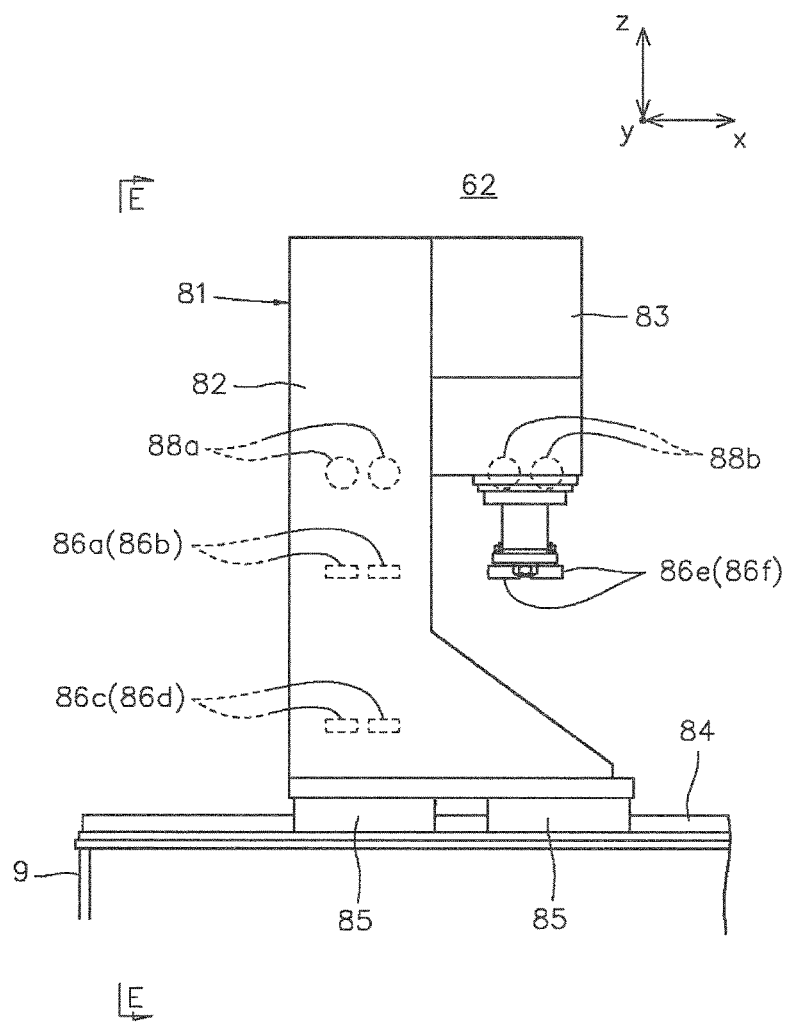
FIG. 12 is an enlarged side view showing a workpiece clamping unit of the workpiece holder.
Figure 13:
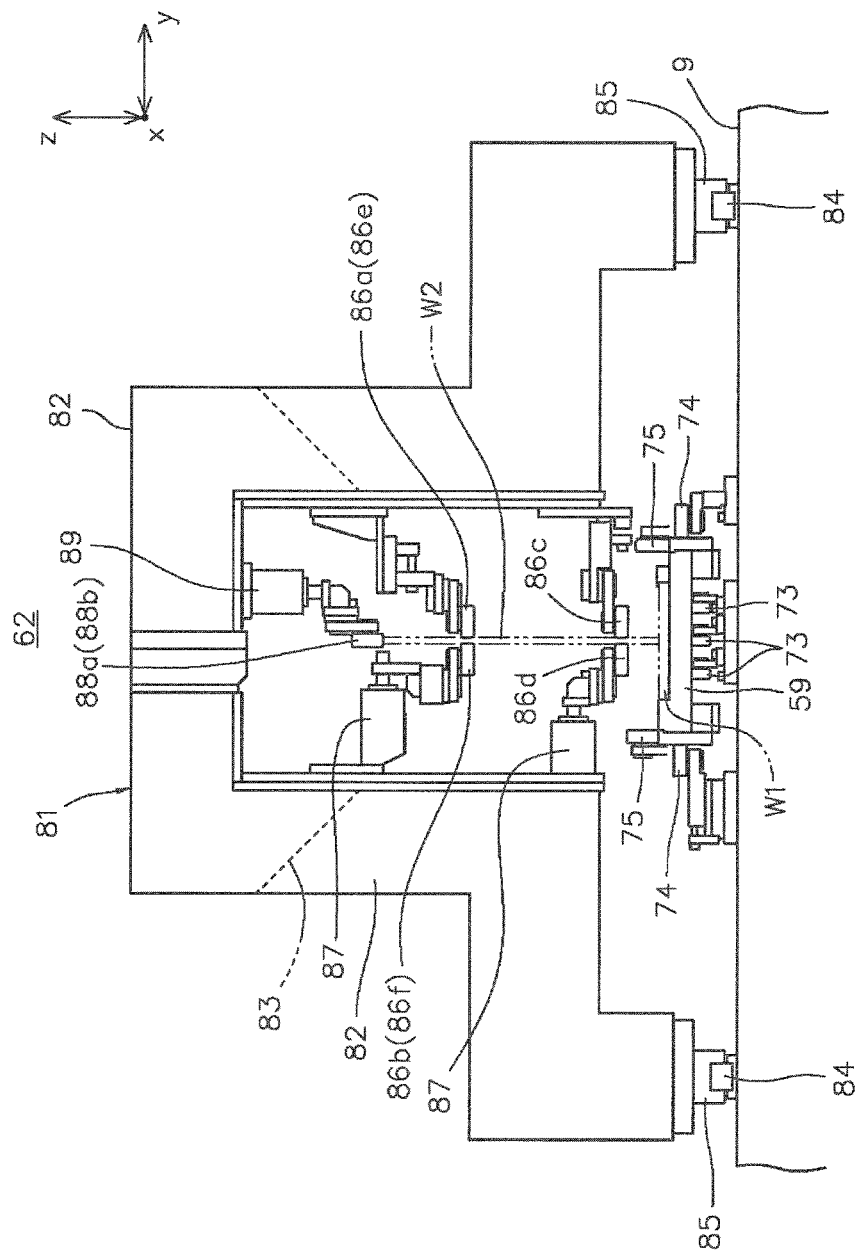
FIG. 13 is a view taken in the directions of arrows E-E of FIG. 12.
Figure 14:
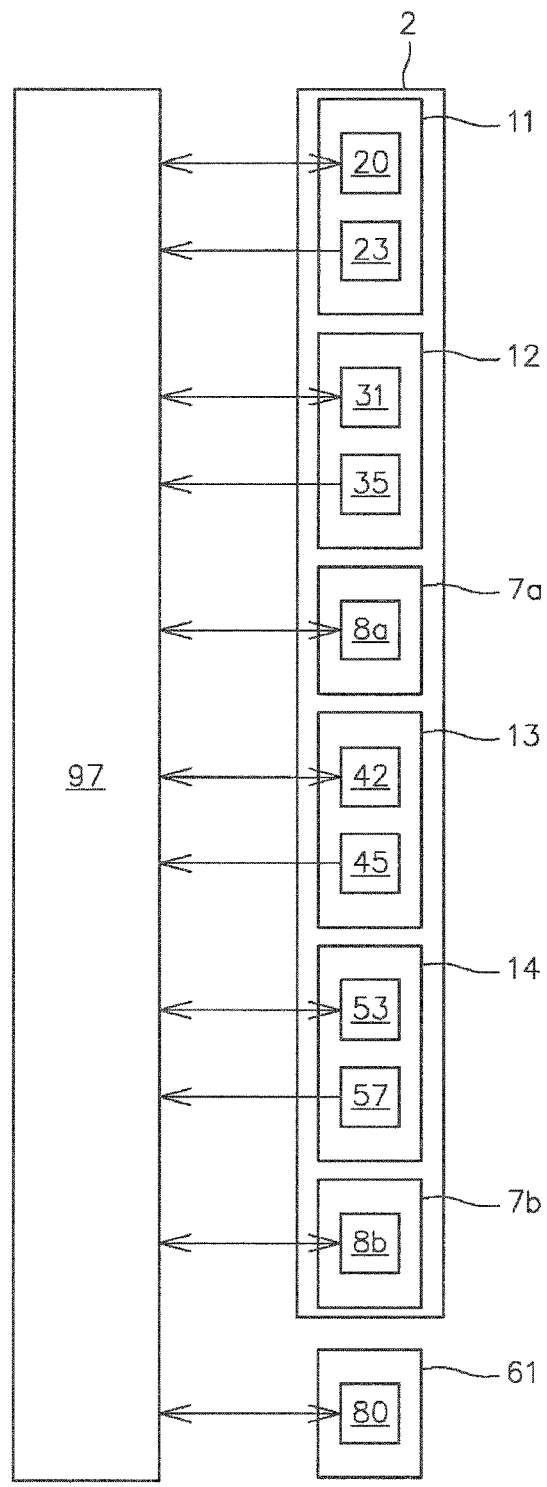
FIG. 14 is a block diagram showing an outline of a control system in the first embodiment.

FIG. 1 is a schematic side view showing a first embodiment of a friction stir welding device. FIG. 2 is a schematic top view of FIG. 1, and FIG. 3 is a view taken in the directions of arrows A-A of FIG. 1. FIGS. 4A and 4B are enlarged views showing portions of friction stir welding tools wherein FIG. 4A is a top view and FIG. 4B is a view taken in the directions of arrows B-B of FIG. 4A. FIG. 5 is an enlarged view of a welding device main body when viewed from the front in an advancing direction. FIG. 6 is a partial sectional view showing axially perpendicular movement units of the welding device main body. FIG. 7 is a view taken in the directions of arrows C-C of FIG. 6. FIG. 8 is a partial sectional view showing axial movement units of the welding device main body. FIG. 9 is a view taken in the directions of arrows D-D of FIG. 8. FIG. 10 is a schematic top view showing a workpiece holder in the first embodiment. FIGS. 11A and 11B are enlarged views showing a workpiece table of the workpiece holder wherein FIG. 11A is a top view and FIG. 11B is a side view. FIG. 12 is an enlarged side view showing a workpiece clamping unit of the workpiece holder. FIG. 13 is a view taken in the directions of arrows E-E of FIG. 12. FIG. 14 is a block diagram showing an outline of a control system in the first embodiment.

As shown in FIG. 4B, a friction stir welding device of the present embodiment uses two corners (inner corners) $c1$ and $c2$, which are formed by a first workpiece W1 and a second workpiece W2 whose end edge is abutted in a posture intersecting a face P1 of the first workpiece W1 at a predetermined angle, as a target of friction stir welding. In the present embodiment, a case in which the face P1 of the first workpiece W1 is horizontally disposed and the second workpiece W2 is abutted against the face P1 of the first workpiece W1 from above in a vertical posture will be described as an example.

For the convenience of description, directions and postures will be described by setting a three-dimensional orthogonal coordinate system in which an advancing direction of friction stir welding, which is an extending direction of each of the corners $c1$ and $c2$, is defined as an x-axial direction, a direction parallel to the face P1 of the first workpiece W1 within a plane perpendicular to the x-axial direction is defined as a y-axial direction, and a direction orthogonal to both the x-axial direction and the y-axial direction is defined as a z-axial direction. In the present embodiment, since an xy plane following the face P1 of the first workpiece W1 is a horizontal plane, the z-axial direction is a vertical direction, and the second workpiece W2 is disposed along an xz plane, which is a vertical plane.

In this specification, the xy plane represents a plane that follows the x-axial direction and the y-axial direction, the xz plane represents a plane that follows the x-axial direction and the z-axial direction, and a yz plane represents a plane that follows the y-axial direction and the z-axial direction, and thus these planes do not refer to planes whose positions are specified.

As shown in FIGS. 1 to 3, the friction stir welding device of the present embodiment includes a workpiece holder 1 that holds the first workpiece W1 and the second workpiece W2 in a state in which the workpieces are abutted as described above, and a welding device main body 2, and further has a constitution in which each of the workpieces W1 and W2 held on the workpiece holder 1 and the welding device main body 2 are relatively movable along the x-axial direction.

As shown in FIGS. 4A and 4B, the welding device main body 2 includes a first friction stir welding tool 3a used to weld the corner c1 of the two corners c1 and c2 which is close to one lateral surface P2a of the second workpiece W2, and a second friction stir welding tool 3b used to weld the corner c2 that is close to the other lateral surface P2b.

The first friction stir welding tool 3a is configured to include a rotatable probe 4a and a stationary shoulder 5a, which is disposed on an outer circumference of the probe 4a and located around a base end of the probe 4a. The probe 4a may be disposed in a posture making an angle at which a direction of a central axis thereof is parallel to a bisector of an angle of the corner c1 within the yz plane. In the present embodiment, since the corner c1 is a right angle, the direction of the central axis of the probe 4a is disposed in a posture making a diagonally downward angle that is inclined at an angle of 45 degrees from the z-axial direction (the vertical direction) following the second workpiece W2 to the vicinity of the one lateral surface P2a within the yz plane. The stationary shoulder 5a has a chevron shape (a V shape) in which an end thereof disposed near a tip of the probe 4a includes two workpiece contact faces 6a that are brought into contact with the face P1 of the first workpiece W1 and the lateral surface P2a of the second workpiece W2, both of which form the corner c1.

As shown in FIG. 5, the first friction stir welding tool 3a is used in a state in which the first friction stir welding tool 3a is mounted on a tip side of a first spindle unit 7a including a rotary driving means 8a of the probe 4a.

As shown in FIGS. 4A and 4B, the second friction stir welding tool 3b is configured to include a rotatable probe 4b and a stationary shoulder 5b which is disposed on an outer circumference of the probe 4b and located around a base end of the probe 4b. The probe 4b may be disposed in a posture making an angle at which a direction of a central axis thereof is parallel to a bisector of an angle of the corner c2 within the yz plane. In the present embodiment, since the corner c2 is a right angle, the direction of the central axis of the probe 4b is disposed in a posture making a diagonally downward angle that is inclined at an angle of 45 degrees from the z-axial direction (the vertical direction) following the second workpiece W2 to the vicinity of the other lateral surface P2b within the yz plane. The stationary shoulder 5b has a chevron shape (a V shape) in which an end thereof disposed near a tip of the probe 4b includes two workpiece contact faces 6a that are brought into contact with the face P1 of the first workpiece W1 and the lateral surface P2b of the second workpiece W2, both of which form the corner c2.

As shown in FIG. 5, the second friction stir welding tool 3b is used in a state in which the second friction stir welding tool 3b is mounted on a tip side of a first spindle unit 7b including a rotary driving means 8b of the probe 4b.

In the present embodiment, as shown in FIG. 4A, the first and second friction stir welding tools 3a and 3b are disposed at the same position in the x-axial direction by sandwiching the second workpiece W2 between the stationary shoulders 5a and 5b and between the probes 4a and 4b.

As shown in FIG. 4B, in the first and second friction stir welding tools 3a and 3b, amounts of protrusion of the probes 4a and 4b from the stationary shoulders 5a and 5b are set such that there is no possibility that, when the corners c1 and c2 are simultaneously subjected to friction stir welding at both sides of the second workpiece W2, interference occurs between the probes 4a and 4b retracted into the respective corners c1 and c2, and particularly between stir regions s1 and s2 of the corners c1 and c2 due to the respective probes 4a and 4b.

Thereby, in the first and second workpieces W1 and W2, friction stir welding of the corners c1 and c2 caused by the respective friction stir welding tools 3a and 3b is performed as partial stir welding in which the stir regions s1 and s2 do not interfere with each other due to the probes 4a and 4b. For this reason, in the first and second workpieces W1 and W2 that are welded, mutually abutting surfaces partially remain between portions welded by stirring in the stir regions s1 and s2.

According to a disposition of each of the friction stir welding tools 3a and 3b, a position at which a pressing load directed toward the corner c1 is applied to the first friction stir welding tool 3a and a position at which a pressing load directed toward the corner c2 is applied to the second friction stir welding tool 3b are located at the same position in the x-axial direction, that is, within the same yz plane, by sandwiching the second workpiece W2 between the positions. For this reason, a rotational moment does not occur at each of the workpieces W1 and W2 or a workpiece table 59 of the workpiece holder 1 (to be described below) within the xy plane due to each of the pressing loads.

As shown in FIGS. 1 and 2, the welding device main body 2 includes a portal-shaped frame 10 that is disposed to intersect the workpiece holder 1 in the y-axial direction. As shown in FIGS. 2, 3, and 5, the first spindle unit 7a is mounted on a first end side of the frame 10 in the y-axial direction via a first axially perpendicular movement unit 11 and a first axial movement unit 12. The second spindle unit 7b is mounted on a second end side of the frame 10 in the y-axial direction via a second axially perpendicular movement unit 13 and a second axial movement unit 14.

As shown in FIGS. 5, 6 and 7, the first axially perpendicular movement unit 11 moves the first spindle unit 7a within the yz plane in a direction (hereinafter referred to as a q-axial direction) that is orthogonal to a direction (hereinafter referred to as a p-axial direction) following the direction of the central axis of the probe 4a (see FIGS. 4A and 4B).

For this reason, the first axially perpendicular movement unit 11 includes a baseplate 15 that is mounted on the frame 10, guide rails 16 that are provided for the baseplate 15 to extend in the q-axial direction, a movable table 18 that is slidably mounted on the guide rails 16 via guide blocks 17, and a ball screw mechanism 19 that acts as a q-axial linear motion mechanism moving the movable table 18 in longitudinal directions of the guide rails 16.

The ball screw mechanism 19 includes a servomotor 20, a threaded shaft 21 that is coupled to an output side of the servomotor 20, and a nut member 22 that is mounted on the threaded shaft 21.

Further, the ball screw mechanism 19 is installed on a surface of the baseplate 15 in a posture in which the threaded shaft 21 extends to be parallel to the guide rails 16, and the nut member 22 is mounted on the movable table 18 via a load cell 23 and a mounting member 24.

The first axially perpendicular movement unit 11 configured as above rotates the threaded shaft 21 with a driving force of the servomotor 20 to enable the movable table 18 to move along the guide rails 16 in the q-axial direction along with the nut member 22.

In a state in which the first axially perpendicular movement unit 11 stops the driving force from the servomotor 20, the movable table 18 can move along the guide rails 16 without control.

Further, in the first axially perpendicular movement unit 11, for example, a gas spring 25 disposed in the q-axial direction is provided as a mechanical gravity compensation mechanism (also called a dead load compensation mechanism or a weight compensation mechanism) for supporting a dead load of the movable table 18 and a component of a weight applied to the movable table 18 in a direction following the guide rails 16.

The gas spring 25 has the first end side mounted in a fixing place of the baseplate 15 side and the second end side mounted on the movable table 18. The weight applied to the movable table 18 refers to weights of the nut member 22, the load cell 23, the mounting member 24, the first axial movement unit 12, and the first spindle unit 7a.

As shown in FIGS. 5, 8 and 9, the first axial movement unit 12 moves the first spindle unit 7a in the p-axial direction.

For this reason, the first axial movement unit 12 includes a baseplate 26 that is mounted on the movable table 18 of the first axially perpendicular movement unit 11, guide rails 27 that are provided for the baseplate 26 to extend in the p-axial direction, a movable table 29 that is slidably mounted on the guide rails 27 via guide blocks 28, and a ball screw mechanism 30 that acts as a p-axial linear motion mechanism moving the movable table 29 in longitudinal directions of the guide rails 27.

The ball screw mechanism 30 includes a servomotor 31, a decelerator 32 that is connected to an output side of the servomotor 31, a threaded shaft 33 that is coupled to an output side of the decelerator 32, and a nut member 34 that is mounted on the threaded shaft 33.

Further, the ball screw mechanism 30 is installed on a surface of the baseplate 26 in a posture in which the threaded shaft 33 extends to be parallel to the guide rails 27, and the nut member 34 is mounted on the movable table 29 via a load cell 35 and a mounting member 36.

The first axial movement unit 12 configured as above rotates the threaded shaft 33 with a driving force of the servomotor 31 via the decelerator 32 to enable the movable table 29 to move along the guide rails 27 in the p-axial direction along with the nut member 34.

As shown in FIG. 5, the first spindle unit 7a is mounted on the movable table 29.

As shown in FIGS. 5 and 6, the second axially perpendicular movement unit 13 moves the second spindle unit 7b within the yz plane in a direction (hereinafter referred to as an s-axial direction) that is orthogonal to a direction (hereinafter referred to as an r-axial direction) following the direction of the central axis of the probe 4b (see FIGS. 4A and 4B).

For this reason, the second axially perpendicular movement unit 13 includes a baseplate 37 that is mounted on the frame 10, guide rails 38 that are provided for the baseplate 37 to extend in the s-axial direction, a movable table 40 that is slidably mounted on the guide rails 38 via guide blocks 39, and a ball screw mechanism 41 that acts as an s-axial linear motion mechanism moving the movable table 40 in longitudinal directions of the guide rails 38.

The ball screw mechanism 41 includes a servomotor 42, a threaded shaft 43 that is coupled to an output side of the servomotor 42, and a nut member 44 that is mounted on the threaded shaft 43.

Further, the ball screw mechanism 41 is installed on a surface of the baseplate 37 in a posture in which the threaded shaft 43 extends to be parallel to the guide rails 38, and the nut member 44 is mounted on the movable table 40 via a load cell 45 and a mounting member 46.

The second axially perpendicular movement unit 13 configured as above rotates the threaded shaft 43 with a driving force of the servomotor 42 to enable the movable table 40 to move along the guide rails 38 in the s-axial direction along with the nut member 44.

In a state in which the second axially perpendicular movement unit 13 stops the driving force from the servomotor 42, the movable table 40 can move along the guide rails 38 without control.

Further, in the second axially perpendicular movement unit 13, for example, a gas spring 47 disposed in the s-axial direction is provided as a mechanical gravity compensation mechanism for supporting a dead load of the movable table 40 and a component of a weight applied to the movable table 40 in a direction following the guide rails 38.

The gas spring 47 has a first end side mounted on a fixing portion of the baseplate 37 side and a second end side mounted on the movable table 40. The weight applied to the movable table 40 refers to weights of the nut member 44, the load cell 45, the mounting member 46, the second axial movement unit 14, and the second spindle unit 7b.

As shown in FIGS. 5 and 8, the second axial movement unit 14 moves the second spindle unit 7b in the r-axial direction.

For this reason, the second axial movement unit 14 includes a baseplate 48 that is mounted on the movable table 40 of the second axially perpendicular movement unit 13, guide rails 49 that are provided for the baseplate 48 to extend in the r-axial direction, a movable table 51 that is slidably mounted on the guide rails 49 via guide blocks 50, and a ball screw mechanism 52 that acts as an r-axial linear motion mechanism moving the movable table 51 in longitudinal directions of the guide rails 49.

The ball screw mechanism 52 includes a servomotor 53, a decelerator 54 that is connected to an output side of the servomotor 53, a threaded shaft 55 that is coupled to an output side of the decelerator 54, and a nut member 56 that is mounted on the threaded shaft 55.

Further, the ball screw mechanism 52 is installed on a surface of the baseplate 48 in a posture in which the threaded shaft 55 extends to be parallel to the guide rails 49, and the nut member 56 is mounted on the movable table 51 via a load cell 57 and a mounting member 58.

The second axial movement unit 14 configured as above rotates the threaded shaft 55 with a driving force of the servomotor 53 via the decelerator 54 to enable the movable table 51 to move along the guide rails 49 in the r-axial direction along with the nut member 56.

As shown in FIG. 5, the second spindle unit 7b is mounted on the movable table 51.

In the welding device main body 2, the first friction stir welding tool 3a mounted on the first spindle unit 7a is configured such that adjustment of a position and control of a force in the q-axial direction are performed by the first axially perpendicular movement unit 11. In addition, the first friction stir welding tool 3a is configured such that adjustment of a position and control of a force in the p-axial direction are performed by the first axial movement unit 12.

Likewise, the second friction stir welding tool $3b$ mounted on the second spindle unit $7b$ is configured such that adjustment of a position and control of a force in the s-axial direction are performed by the second axially perpendicular movement unit 13. In addition, the second friction stir welding tool $3b$ is configured such that adjustment of a position and control of a force in the r-axial direction are performed by the second axial movement unit 14.

Therefore, in the welding device main body 2, since a pressing load of the first friction stir welding tool $3a$ against the corner $c1$ is applied in the p-axial direction, the pressing load can be controlled by controlling only an output of the first axial movement unit 12 on the basis of a detected result of the load cell 35. On the other hand, the position of the first friction stir welding tool $3a$ in the q-axial direction can be adjusted by the first axially perpendicular movement unit 11 without participating in control of the pressing load.

Similarly, in the welding device main body 2, since a pressing load of the second friction stir welding tool $3b$ against the corner $c2$ is applied in the r-axial direction, the pressing load can be controlled by controlling only an output of the second axial movement unit 14 on the basis of a detected result of the load cell 57. On the other hand, a position of the second friction stir welding tool $3b$ in the s-axial direction can be adjusted by the second axially perpendicular movement unit 13 without participating in the control of the pressing load.

As shown in FIGS. 1, 2, 3 and 5, the workpiece holder 1 includes the workpiece table 59 that disposes and holds the first and second workpieces W1 and W2, guiding means 60 for guiding the workpiece table 59 in the x-axial direction through an inner place of the frame 10 in a pedestal 9, and driving means 61 for moving the workpiece table 59 in the x-axial direction.

Further, the workpiece holder 1 includes a workpiece clamping unit 62 for maintaining a relative position between the first and second workpieces W1 and W2 moving along with the workpiece table 59 in the vicinity of a place at which friction stir welding is carried out by the welding device main body 2.

As shown in FIGS. 11A and 11B, a length of the workpiece table 59 in the x-axial direction is longer than the first workpiece W1 and the second workpiece W2.

As shown in FIGS. 5 and 11A, a stepped part 64 that abuts a first end of the first workpiece W1 in the y-axial direction is provided on the surface of the workpiece table 59 at a first side of a region 63, in which the first workpiece W1 is disposed, in the y-axial direction. Y-axial clamps 65 and z-axial clamps 66 are provided at a second side of the region 63 in the y-axial direction and alternately arranged at a certain interval in the x-axial direction.

The y-axial clamps 65 clamp the first workpiece W1 between the stepped part 64 and the y-axial clamps 65 in the y-axial direction. The z-axial clamps 66 fix an edge of a second end of the first workpiece W1 in the y-axial direction by sandwiching the first workpiece W1 between the surface of the workpiece table 59 and the z-axial clamps 66 in the z-axial direction.

End pressing members $67a$ and $67b$ that abuts both ends of the first workpiece W1 and the second workpiece W2 in the x-axial direction to prevent displacement in the x-axial direction are provided on surfaces of both end sides of the workpiece table 59 in the x-axial direction.

Each of the end pressing members $67a$ and $67b$ is configured, for example, such that a longitudinal plate 69 having the same thickness as the second workpiece W2 is integrated with a transverse plate 68 having the same thickness as the first workpiece W1 by abutting the transverse plate 68 at the same angle as an angle at which the second workpiece W2 abuts the first workpiece W1. In the present embodiment, each of the end pressing members $67a$ and $67b$ has an inverted T-shaped structure in which the longitudinal plate 69 is abutted on and integrated with the transverse plate 68 in a vertical arrangement.

In each of the end pressing members $67a$ and $67b$, the transverse plate 68 is mounted on the surface of the workpiece table 59 in a posture in which the transverse plate 68 and the longitudinal plate 69 follow the x-axial direction together.

Each of the longitudinal plates 69 includes a holder 70 for holding an edge of the end of the second workpiece W2 in the x-axial direction by sandwiching the edge from both sides of the y-axial direction.

When friction stir welding is carried out, the first end pressing member $67a$ disposed at a front end side in a direction in which the workpiece table 59 is advanced, that is, at a start end side (a right side in FIGS. 11A and 11B) of friction stir welding of each of the corners $c1$ and $c2$, and preferably enables a mounting position for the workpiece table 59 to be changed in the x-axial direction. In this way, when dimensions of the first and second workpieces W1 and W2 subjected to friction stir welding are changed, the mounting position of the first end pressing member $67a$ for the workpiece table 59 is changed so that both ends of each of the first and second workpieces W1 and W2 can be disposed to abut the end pressing members $67a$ and $67b$. For this reason, when the first and second workpieces W1 and W2 having different dimensions in the x-axial direction are subject to friction stir welding, the workpiece table 59 can be commonly used.

Racks 71 extending in the x-axial direction are provided at both end sides of the workpiece table 59 in the y-axial direction on a back surface of the workpiece table 59 over a full length thereof.

As shown in FIG. 10 by a two-dot chain line, a table movement path 72 for moving the workpiece table 59 in the x-axial direction is set in the middle of the pedestal 9 in the y-axial direction.

The guiding means 60 includes bottom guide rollers 73, side guide rollers 74, and top guide rollers 75, all of which are disposed along the table movement path 72.

As shown in FIG. 3, the bottom guide rollers 73 receive the back surface of the workpiece table 59 moving along the table movement path 72 (see FIG. 10) in the x-axial direction at a position at which they do not interfere with each of the racks 71. As shown in FIG. 10, a plurality of bottom guide rollers 73 are provided inside a region following the table movement path 72 on a surface of the pedestal 9, for instance, in a zigzag arrangement in the x-axial and y-axial directions. Further, the bottom guide rollers 73 are preferably configured such that a place at which the first and second spindle units $7a$ and $7b$ are disposed in the x-axial direction has a higher array density than other places. This is because, when each of the corners $c1$ and $c2$ of the first and second workpieces W1 and W2 held on the workpiece table 59 is subjected to friction stir welding, a z-axial component of a load which presses each of the friction stir welding tools $3a$ and $3b$ (see FIGS. 4A and 4B) against each of the corners $c1$ and $c2$ is received by more bottom guide rollers 73.

As shown in FIGS. 2 and 3, the side guide rollers 74 are for receiving both y-axial lateral surfaces of the workpiece table 59 moving along the table movement path 72 (see FIG. 10) in the x-axial direction. As shown in FIG. 10, the side guide rollers 74 are provided at both sides of the table movement path 72 in the y-axial direction and arranged at certain intervals in the x-axial direction.

As shown in FIGS. 2 and 3, the top guide rollers 75 are brought into contact with edges of both y-axial ends of the surface of the workpiece table 59 moving along the table movement path 72 (see FIG. 10) in the x-axial direction. As shown in FIG. 10, the top guide rollers 75 are located at both of the sides of the table movement path 72 in the y-axial direction, and are provided at both of the sides, between which the place (see FIG. 2) at which the first and second spindle units 7a and 7b are disposed in the x-axial direction is sandwiched, in a two-by-two group at a certain interval in the x-axial direction. In this way, providing the top guide rollers 75 in twos more reliably prevents an inclination of the workpiece table 59 in the z-axial direction. Of course, the top guide rollers 75 may be disposed in an arrangement other than the two-by-two group.

Thereby, the guiding means 60 can guide movement of the workpiece table 59 in the x-axial direction while restraining displacement of the workpiece table 59 in the z-axial and y-axial directions depending on each of the bottom guide rollers 73, each of the side guide rollers 74, and each of the top guide rollers 75.

In the guiding means 60, while positions of the side guide rollers 74 and the top guide rollers 75 provided at first side of the table movement path 72 in the y-axial direction are fixed, the side guide rollers 74 and the top guide rollers 75 provided at the second side of the table movement path 72 in the y-axial direction can be subjected to adjustment of installed positions thereof in the y-axial direction. This is for disposing each of the side guide rollers 74 and each of the top guide rollers 75 according to dimensions of the workpiece table 59 that is actually used.

As shown in FIGS. 1, 2, 3 and 10, the driving means 61 includes a pair of pinion gears 76 which can be meshed with the racks 71 of the workpiece table 59 at a place below the table movement path 72 (see FIG. 10) in the pedestal 9. As shown in FIG. 1, each of the pinion gears 76 is preferably disposed adjacent to the place at which the first spindle unit 7a and the second spindle unit 7b are disposed in the x-axial direction. This is for enabling a driving force in the x-axial direction to be applied to the workpiece table 59 in the vicinity of the place at which the friction stir welding is performed.

Each of the pinion gears 76 is coupled to a y-axial rotary shaft 78 supported by a bearing 77 (see FIG. 10). A first end side of the rotary shaft 78 is coupled to an output side of a decelerator 79 provided inside the pedestal 9, and a driving motor 80 such as a servomotor is connected to the decelerator 79.

In the driving means 61 configured as above, when the pinion gears 76 is rotated by the driving motor 80 via the decelerator 79, and the workpiece table 59 moves in the x-axial direction along with the racks 71 meshed with the pinion gears 76 while being guided along the table movement path 72 by the guiding means 60. Further, forward and backward rotations of the driving motor 80 are switched, and thereby the workpiece table 59 can be reciprocated in the x-axial direction.

As shown in FIGS. 12 and 13, the workpiece clamping unit 62 includes a frame 81 that is disposed at a second end side of the x-axial direction which is a side opposite to the frame 10 with respect to the first and second spindle units 7a and 7b shown in FIGS. 1 and 2.

As shown in FIG. 13, the frame 81 includes a portal-shaped part 82 disposed to intersect the table movement path 72 in the y-axial direction, and is provided with a protrusion 83 at a first end face side of the portal-shaped part 82 in the x-axial direction as shown in FIG. 12. As shown in FIG. 2, the protrusion 83 has a shape in which the protrusion 83 can be inserted into and disposed in a space formed between the first spindle unit 7a and the second spindle unit 7b.

The frame 81 is slidably supported via guide blocks 85 by a pair of guide rails 84 at places at which both end sides of the portal-shaped part 82 in the y-axial direction come closer to both ends of the pedestal 9 in the y-axial direction. Thereby, the frame 81 can move along the guide rails 84 between an arrangement in which the insertion of the protrusion 83 is into the space between the first spindle unit 7a and the second spindle unit 7b as shown in FIG. 2 by a solid line is maintained and an arrangement in which the separation of the protrusion 83 from the first spindle unit 7a and the second spindle unit 7b as shown in FIG. 2 by a two-dot chain line is maintained.

Further, although not shown, a frame fixing means for releasably fixing a position of the frame 81 in an arrangement shown in FIG. 2 by the solid line is provided between the frame 81 and the pedestal 9.

As shown in FIGS. 12 and 13, a pair of side clamping rollers 86a and 86b and a pair of side clamping rollers 86c and 86d, which are disposed to face each other in the y-axial direction to bring both of the lateral surfaces P2a and P2b (see FIGS. 4A and 4B) of the second workpiece W2 into contact with two places in the z-axial direction, are provided inside the portal-shaped part 82.

In the pair of side clamping rollers 86a and 86b and the pair of side clamping rollers 86c and 86d, for example, each of the side clamping rollers 86a and 86c disposed at first side in the y-axial direction is fixed to the portal-shaped part 82. On the other hand, each of the side clamping rollers 86b and 86d disposed at the second side in the y-axial direction is mounted on the portal-shaped part 82 via a hydraulic cylinder 87 acting as a pressing means disposed in the y-axial direction. Accordingly, in the pair of side clamping rollers 86a and 86b and the pair of side clamping rollers 86c and 86d, the hydraulic cylinders 87 are expansibly operated with the second workpiece W2 interposed between the side clamping rollers such that the side clamping rollers 86a and 86c and the side clamping rollers 86b and 86d are pressed against both of the lateral surfaces P2a and P2b of the second workpiece W2 from both sides. For this reason, the position of the second workpiece W2 in the y-axial direction is maintained.

Further, a top clamping roller 88a that presses an end of the second workpiece W2 which is located at the side opposite to the first workpiece W1 side is provided inside the portal-shaped part 82 at an end side away from the pedestal 9. The top clamping roller 88a is mounted on the portal-shaped part 82 via a hydraulic cylinder 89 acting as a pressing means disposed in a direction following the surface of the second workpiece W2 within the xy plane, that is, in the z-axial direction, in the present embodiment. Thereby, the hydraulic cylinder 89 is expansibly operated in a state in which the top clamping roller 88a is disposed to come into contact with the end of the second workpiece W2 such that the top clamping roller 88a presses the second workpiece W2 against the first workpiece W1 with a force in the direction following the surface of the second workpiece W2. Due to a pressing force received from the second workpiece W2, the first workpiece W1 is pressed against the workpiece table 59. For this reason, the positions of the first and second workpieces W1 and W2 in the z-axial direction are maintained.

The protrusion 83 is provided with a pair of side clamping rollers 86e and 86f and a hydraulic cylinder 87, and a top clamping roller 88b and the hydraulic cylinder 89. The pair of side clamping rollers 86e and 86f and the hydraulic cylinder 87 have the same constitution as the pair of side clamping rollers 86a and 86b and the hydraulic cylinder 87. The top clamping roller 88b and the hydraulic cylinder 89 have the same constitution as the top clamping roller 88a and the hydraulic cylinder 89. When the protrusion 83 is arranged to be inserted into the space between the first spindle unit 7a and the second spindle unit 7b as shown in FIG. 2, the pair of side clamping rollers 86e and 86f and the top clamping roller 88b are preferably disposed above each of the friction stir welding tools 3a and 3b (see FIG. 3).

Each of the side clamping rollers 86a to 86f and each of the top clamping rollers 88a and 88b are preferably configured to have twin roller main bodies arranged side by side in the x-axial direction. This is because a deviation in the y-axial or z-axial direction from a posture in which the second workpiece W2 forms an angle in the x-axial direction is more reliably prevented.

When the corners c1 and c2 of the workpieces W1 and W2 are subjected to friction stir welding, the workpiece clamping unit 62 configured as above disposes the frame 81 as shown in FIG. 2 by a solid line. In this state, in the vicinity of a place at which the friction stir welding is performed in the workpiece clamping unit 62, a y-axial displacement of the second workpiece W2 used for the friction stir welding can be prevented, and a z-axial displacement of the first and second workpieces W1 and W2 can be prevented.

Meanwhile, when friction stir welding is performed, the frame 10 on which each of the spindle units 7a and 7b is supported is affected by a reaction force of the pressing load applied to each of the friction stir welding tools 3a and 3b. In contrast, since the workpiece clamping unit 62 includes the frame 81 independent of the frame 10, the maintenance of the position of each of the workpieces W1 and W2 by the workpiece clamping unit 62 is not affected by the reaction force of the pressing load applied to each of the friction stir welding tools 3a and 3b.

When friction stir welding is not carried out, the workpiece clamping unit 62 can be disposed at a position away from the welding device main body 2 as shown in FIG. 2 by a two-dot chain line by releasing positional fixation caused by the frame fixing means (not shown). In this state, since the protrusion 83 is exposed, a worker can easily approach the side clamping rollers 86e and 86f or the top clamping roller 88b to do checkup or maintenance work. Also, in the state, since the workpiece clamping unit 62 is not present around the first spindle unit 7a, the first friction stir welding tool 3a, around the second spindle unit 7b, and the second friction stir welding tool 3b, a worker can easily approach these devices to do checkup or maintenance work.

Further, as shown in FIGS. 1 and 2, the friction stir welding device of the present embodiment includes table support stands 90 for supporting a portion of the workpiece table 59 projected from the pedestal 9 as parts that assist the workpiece holder 1.

The table support stands 90 are disposed on an extension line of the table movement path 72 (see FIG. 10) outside the pedestal 9 when used. Each of the table support stands 90 includes a bottom guide roller 91 that receives the back surface of the workpiece table 59 at a position at which the bottom guide roller 91 does not interfere with the racks 71, and side guide rollers 92 for receiving both of the lateral surfaces of the workpiece table 59 in the y-axial direction at an upper end side thereof.

Further, each of the table support stands 90 includes traveling wheels 93 and elevatable support legs 94 at a bottom thereof in order to facilitate installation and removal corresponding to a use situation.

The support legs 94 can be disposed in a state in which they are lowered to protrude downward from lower ends of the traveling wheels 93 and in a state in which they are raised upward from the lower ends of the traveling wheels 93.

An elevating means of the support legs 94 includes, for instance, a strut 95 that is threaded on each of the support legs 94. The table support stand 90 is provided with nut members 96, and the struts 95 are rotated with respect to the nut members 96. Thereby, the support legs 94 may be relatively elevated with regard to the table support stand 90.

Further, as shown in FIG. 14, the friction stir welding device of the present embodiment is provided with a control system having a control device 97.

The control device 97 has a function of controlling the first spindle unit 7a, the second spindle unit 7b, the first axially perpendicular movement unit 11, the first axial movement unit 12, the second axially perpendicular movement unit 13, the second axial movement unit 14, and the driving means 61.

The control device 97 has a function of giving a control instruction, which relates to a rotational speed (a rotational frequency) of the probe 4a of the first friction stir welding tool 3a, to the rotating means 8a with regard to the first spindle unit 7a. A result of detecting the rotational speed of the probe 4a and a result of detecting spindle torque needed for rotation of the probe 4a are input to the control device 97 by the rotating means 8a.

With regard to the second spindle unit 7b, the control device 97 has a function of giving the rotating means 8b a control instruction that relates to a rotational speed (a rotational frequency) of the probe 4b of the second friction stir welding tool 3b. A result of detecting the rotational speed of the probe 4b and a result of detecting spindle torque needed for rotation of the probe 4b are input to the control device 97 by the rotating means 8b.

Further, with regard to both of the spindle units 7a and 7b, the control device 97 has a function of detecting rotational phases of the rotating means 8a and 8b and a function of performing an operation that synchronizes the rotational phases of the rotating means 8a and 8b as needed.

With regard to the first axially perpendicular movement unit 11, the control device 97 has a function of giving the servomotor 20 an instruction to move the movable table 18 and a function of detecting a position of the movable table 18 on the basis of a signal input by an encoder (not shown) of the servomotor 20. A detected result of the load cell 23 is input to the control device 97.

With regard to the first axial movement unit 12, the control device 97 has a function of giving the servomotor 31 an instruction to move the movable table 29 and a function of detecting a position of the movable table 29 on the basis of a signal input by an encoder (not shown) of the servomotor 31. The control device 97 also has a function of, when a detected result of the load cell 35 is input, detecting a pressing load applied to the first friction stir welding tool 3a on the basis of the detected result.

With regard to the second axially perpendicular movement unit 13, the control device 97 has a function of giving the servomotor 42 an instruction to move the movable table 40 and a function of detecting a position of the movable table 40 on the basis of a signal input by an encoder (not shown) of the servomotor 42. A detected result of the load cell 45 is input to the control device 97.

With regard to the second axial movement unit 14, the control device 97 has a function of giving the servomotor 53 an instruction to move the movable table 51 and a function of detecting a position of the movable table 51 on the basis of a signal input by an encoder (not shown) of the servomotor 53. The control device 97 also has a function of, when a detected result of the load cell 57 is input, detecting a pressing load applied to the second friction stir welding tool 3b on the basis of the detected result.

Further, the control device 97 includes a positioning control mode according to a typical numerical control in which the movable tables 18 and 40 are instructed to move to a targeted position and the following two control modes as control modes for the axially perpendicular movement units 11 and 13.

The first of the control modes is a load-dependent control mode according to the detected results of the load cells 23 and 45. This load-dependent control mode positions the movable tables 18 and 40 at arbitrary positions and sets loads detected by the load cells 23 and 45 as target values at a time of positioning. Afterward, when the loads detected by the load cells 23 and 45 increase or decrease from the target values, the movable tables 18 and 40 are moved in a direction in which the loads return to the target values.

The second of the control modes is a no-control mode. This no-control mode is a mode in which control of the servomotors 20 and 42 is released and the driving forces of the servomotors are released. For this reason, when the control mode is set as the no-control mode, the movable tables 18 and 40 freely move depending on an applied external force in the axially perpendicular movement units 11 and 13.

The control device 97 includes a positioning control mode according to a typical numerical control in which the movable tables 29 and 51 are instructed move to the targeted position and the following two control modes as control modes for the axial movement units 12 and 14.

The first of the control modes is a load-dependent control mode according to the detected results of the load cells 35 and 57. This load-dependent control mode presets target values of the pressing loads of the friction stir welding tools 3a and 3b and increases or decreases the loads given to the friction stir welding tools 3a and 3b such that current values of the pressing loads of the friction stir welding tools 3a and 3b, which are obtained on the basis of the detected results of the load cells 35 and 57, are matched with the target values.

The second of the control modes is a spindle torque-dependent control mode of each of the spindle units 7a and 7b. This spindle torque-dependent control mode presets a target value of the spindle torque of each of the spindle units 7a and 7b and performs control of increasing the pressing load given to each of the friction stir welding tools 3a and 3b when a detected value of the spindle torque input from each of the spindle units 7a and 7b is lower than the target value, and control of decreasing the pressing load given to each of the friction stir welding tools 3a and 3b when the detected value of the spindle torque is higher than the target value.

With regard to the driving means 61, the control device 97 has a function of giving the driving motor 80 an instruction to move the workpiece table 59, and a function of detecting a position of the movable table 59 on the basis of a signal input by an encoder (not shown) of the driving motor 80.

Next, friction stir welding performed using the friction stir welding device of the present embodiment will be described.

Before initiating the friction stir welding, a worker holds the first workpiece W1 and the second workpiece W2 on the workpiece table 59. This task may be performed in a state in which the workpiece table 59 is moved to a position at which the workpiece table 59 does not interfere with the welding device main body 2 and the workpiece clamping unit 62 in the x-axial direction. At this time, the table support stands 90 may be appropriately used.

Next, as shown in FIGS. 1 and 2, the workpiece clamping unit 62 is disposed close to the welding device main body 2, and a position thereof is fixed. Then, each of the side clamping rollers 86a to 86f and each of the top clamping rollers 88a and 88b are subjected to positions adjustment depending on the workpieces W1 and W2 held on the workpiece table 59 to prevent displacement of the second workpiece W2 in the y-axial and z-axial directions and displacement of the first workpiece W1 in the z-axial direction.

The workpiece table 59 is moved by the driving means 61 until end sides of the corners c1 and c2 of the workpieces W1 and W2 at which the friction stir welding is initiated are disposed within the same yz plane as the friction stir welding tools 3a and 3b.

Next, in the welding device main body 2, control according to a positioning control mode of each of the axially perpendicular movement units 11 and 13 and each of the axial movement units 12 and 14 is performed by the control device 97, and position of each of the spindle units 7a and 7b is adjusted so that the probes 4a and 4b of the friction stir welding tools 3a and 3b are disposed close to the respective corners c1 and c2.

In this state, in the welding device main body 2, the rotating means 8a and 8b are actuated by the respective spindle units 7a and 7b, and the rotation of the probes 4a and 4b starts. Then, in the welding device main body 2, the axial movement units 12 and 14 are controlled in the positioning control mode, the spindle units 7a and 7b are moved in the directions of the central axes (the p-axial direction and the r-axial direction) of the probes 4a and 4b, and the rotating probes 4a and 4b are introduced to the corners c1 and c2. Further, the workpiece contact face 6a of the stationary shoulder 5a is brought into contact with the face P1 of the first workpiece W1 and the one lateral surface P2a of the second workpiece W2, and the workpiece contact face 6b of the stationary shoulder 5b is brought into contact with the face P1 of the first workpiece W1 and the other lateral surface P2b of the second workpiece W2.

Thereby, the stir regions s1 and s2 due to the introduced probes 4a and 4b are formed in the corners c1 and c2 of symmetrical positions, between which the second workpiece W2 is sandwiched, in a state in which the stir regions do not interfere with each other.

Next, the driving means 61 initiates the movement of the workpiece table 59. Thereby, since the friction stir welding tools 3a and 3b relatively move to the respective corners c1 and c2, the friction stir welding following the corner c1 and the friction stir welding following the corners c1 and c2 are simultaneously initiated.

When the friction stir welding is initiated in this way, the control mode of each of the axial movement units 12 and 14 is switched to the pressing load-dependent control mode or the spindle torque-dependent control mode in the control device 97.

Thereby, in the pressing load-dependent control mode, the position of the first friction stir welding tool 3a in the p-axial direction is adjusted by the first axial movement unit 12 such that the pressing load of the first friction stir welding tool 3a against the corner c1 is matched a target value. Similarly, the position of the second friction stir welding tool 3b in the r-axial direction is adjusted by the second axial movement unit 14 such that the pressing load of the second friction stir welding tool 3b against the corner c2 is matched a target value.

On the other hand, in the spindle torque-dependent control mode, the position of the first friction stir welding tool 3a in the p-axial direction is adjusted by the first axial movement unit 12 such that the spindle torque becomes constant in the first spindle unit 7a. Similarly, the position of the second friction stir welding tool 3b in the r-axial direction is adjusted by the second axial movement unit 14 such that the spindle torque becomes constant in the second spindle unit 7b.

In the control device 97, as regards each of the axially perpendicular movement units 11 and 13, the control mode is switched to the load-dependent control mode or the no-control mode with the initiation of the friction stir welding.

In the load-dependent control mode, the load detected by each of the load cells 23 and 45 is set as a target value at the start time of the friction stir welding. In this state, for instance, when positional deviation in the y-axial direction occurs at each of the corners c1 and c2 due to an error in manufacturing accuracy or shape, such as a warp, of each of the workpieces W1 and W2, a way in which each of the stationary shoulders 5a and 5b comes into contact with each of the corners c1 and c2 is changed depending on a direction of the positional deviation and amounts of q-axial and s-axial components of an amount of the positional deviation. For this reason, the load detected by each of the load cells 23 and 45 increases or decreases from the target value. In this case, the position of each of the movable tables 18 and 40 supporting the respective spindle units 7a and 7b is adjusted in each of the axially perpendicular movement units 11 and 13 by the control device 97 to become a direction in which the load is reset to the target value.

Even when the positions of the movable tables 18 and 40 are adjusted, the positions of the friction stir welding tools 3a and 3b are continuously adjusted in the axial movement units 12 and 14 in the aforementioned pressing load-dependent control mode or the spindle torque-dependent control mode.

Therefore, in the welding device main body 2, even when the control mode of each of the axial movement units 12 and 14 is either the pressing load-dependent control mode or the spindle torque-dependent control mode, each of the friction stir welding tools 3a and 3b can be moved by following the positional deviation of each of the corners c1 and c2 when the friction stir welding is performed.

On the other hand, when the control mode of each of the axially perpendicular movement units 11 and 13 is switched to the no-control mode, gravity compensation is performed by each of the springs 25 and 47 with respect to the dead load of each of the movable tables 18 and 40 and a weight of the device mounted thereto. For this reason, each of the axially perpendicular movement units hardly receive the resistance of gravity when moving each of the spindle units 7a and 7b and each of the friction stir welding tools 3a and 3b moves.

Therefore, in this case, when the positional deviation occurs at each of the corners c1 and c2, each of the stationary shoulders 5a and 5b slides along the face P1 of the first workpiece W1 even when the control mode of each of the axial movement units 12 and 14 is either the pressing load-dependent control mode or the spindle torque-dependent control mode, thereby following the positional deviation of each of the corners c1 and c2.

For this reason, when the friction stir welding following each of the corners c1 and c2 is performed, the position of each of the friction stir welding tools 3a and 3b is controlled according to each of the corners c1 and c2.

In this way, when the friction stir welding by each of the friction stir welding tools 3a and 3b proceeds to a preset place of a final end side of each of the corners c1 and c2, the control device 97 stops the movement of the workpiece table 59 which is caused by the driving means 61.

Next, the control device 97 resumes the control caused by the positioning control mode of each of the axially perpendicular movement units 11 and 13 and the positioning control mode of each of the axial movement units 12 and 14, moves each of the friction stir welding tools 3a and 3b in a direction away from each of the corners c1 and c2, extracts each of the probes 4a and 4b from each of the corners c1 and c2, and then stops the rotation of each of the probes 4a and 4b which is caused by each of the spindle units 7a and 7b.

Then, in the workpiece clamping unit 62, the holding of the workpieces W1 and W2 is released, and then a welded body of the workpieces W1 and W2 is ejected after the workpiece table 59 is moved to a position at which it does not interfere with the welding device main body 2 and the workpiece clamping unit 62.

In this way, according to the friction stir welding device of the present embodiment, when the corners c1 and c2 between the workpieces W1 and W2 are subjected to friction stir welding using the pair of friction stir welding tools 3a and 3b having the stationary shoulders 5a and 5b, the pressing loads applied to the friction stir welding tools 3a and 3b in the directions directed to the corners c1 and c2 can be controlled by the axial movement units 12 and 14, and synthesis with the outputs of the axially perpendicular movement units 11 and 13 is not necessary. For this reason, in the friction stir welding device of the present embodiment, the controllability of the pressing load applied to each of the friction stir welding tools 3a and 3b can be improved.

In the friction stir welding device of the present embodiment, each of the axially perpendicular movement units 11 and 13 is set to the load-dependent control mode or the no-control mode when the friction stir welding is performed. Thereby, when the pressing load-dependent control mode or the spindle torque-dependent control mode is carried out by each of the axial movement units 12 and 14, contour control of each of the friction stir welding tools 3a and 3b for each of the corners c1 and c2 can be performed.

In the friction stir welding device of the present embodiment, the stationary shoulders 5a and 5b of the friction stir welding tools 3a and 3b can be directly disposed at the corners c1 and c2.

For this reason, for instance, when the corners are subjected to friction stir welding using the friction stir welding tools having the rotary shoulders, triangle sectional members are disposed at the corners, or pretreatment that a portion projected in a triangle cross section is provided at the corner is required for one of the workpieces. However, this pretreatment is not required in the friction stir welding device of the present embodiment.

Further, an amount of protrusion of each of the probes 4a and 4b from each of the stationary shoulders 5a and 5b in each of the friction stir welding tools 3a and 3b is set to perform partial stir welding.

For this reason, in the friction stir welding device of the present embodiment, an amount of insertion of each of the probes 4a and 4b into each of the corners c1 and c2 can be reduced in comparison with a case in which entire stir welding, which is generally performed as the friction stir welding of the corners and in which stir regions interfere with each other due to probes disposed at corners, is performed in the related art.

Thereby, in the friction stir welding device of the present embodiment, when each of the probes 4a and 4b is moved in a state in which each of them is retracted into each of the corners c1 and c2, the reaction force in which each of the probes 4a and 4b receives can be reduced compared to the reaction force in which each of the probes receives when performing the entire stir welding. For this reason, in the friction stir welding device of the present embodiment, in comparison with the case in which the entire stir welding is performed, an operation speed of the friction stir welding can be made faster, and a life span of each of the friction stir welding tools 3a and 3b can be prolonged.

Further, in the friction stir welding device of the present embodiment, an amount of heat that is locally input into a periphery of the retracted place of each of the probes 4a and 4b in each of the workpieces W1 and W2 due to frictional heat generated by the individual probes 4a and 4b is reduced compared to the case in which the entire stir welding is performed. For this reason, the occurrence of distortion or deformation caused by the heat of the workpieces W1 and W2 can be suppressed.

In the friction stir welding device of the present embodiment, since simultaneous operation of the friction stir welding is performed from both of the lateral surfaces of the second workpiece W2 with respect to the corners c1 and c2, each of the workpieces W1 and W2 is heated by the frictional heat generated by each of the probes 4a and 4b at one position in the x-axial direction. For this reason, in the friction stir welding device of the present embodiment, in comparison with a case in which the corners c1 and c2 are heated by the frictional heat generated by the probes disposed at different positions in the x-axial direction, the workpieces W1 and W2 can be more efficiently heated. Therefore, in the friction stir welding device of the present embodiment, with respect to the friction stir welding of the corners c1 and c2, the friction stir welding caused by high heat input can be stabilized.

Further, as heating efficiency of each of the workpieces W1 and W2 is improved as described above, the stir regions s1 and s2 stirred by the probes 4a and 4b are easily softened, and thus the friction stir welding device of the present embodiment can make the operation speed of the friction stir welding faster. Since resistance in rotating the probes 4a and 4b is reduced, the life spans of the friction stir welding tools 3a and 3b can be prolonged.

Further, when the corners c1 and c2 are heated by the frictional heat generated by the probes disposed at the different positions in the x-axial direction, any one of the corners c1 and c2 is heated first, and the other is heated later. For this reason, there is a case in which conditions of heat input are made uneven. However, in the friction stir welding device of the present embodiment, the heat input into the corners c1 and c2 can be made even.

Second Embodiment

Figure 15:
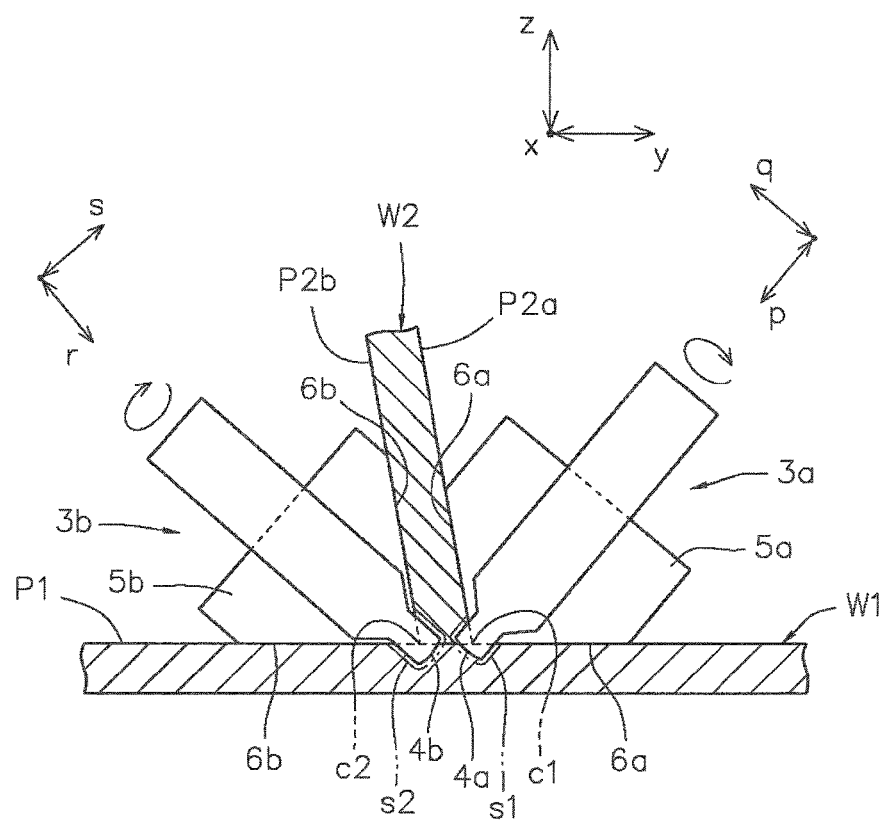
FIG. 15 is a view showing a second embodiment of the friction stir welding device when viewing portions of friction stir welding tools from first side in an advancing direction of friction stir welding.

FIG. 15 is a view showing a second embodiment of the friction stir welding device, and is an enlarged view of portions of friction stir welding tools when viewed from first side in the x-axial direction.

In FIG. 15, the same parts as those shown in FIGS. 4A and 4B will be given the same reference signs, and description thereof will be omitted.

In a friction stir welding device of the present embodiment, two corners (inner corners) c1 and c2, which are formed by a first workpiece W1 and a second workpiece W2 whose end edge is butted in a posture a face P1 of the first workpiece W1 at a predetermined angle, are used as a target of friction stir welding. In the present embodiment, a case in which the face P1 of the first workpiece W1 is disposed along an xy plane which is a horizontal plane and the second workpiece W2 is butted against the face P1 of the first workpiece W1 from above in a posture of forming an angle inclined at a certain angle from an xz plane which is a vertical plane to first side in a y-axial direction will be described as an example. Therefore, the one corner c1 is formed with an obtuse angle, and the other corner c2 is formed with an acute angle.

The friction stir welding device of the present embodiment is configured such that, in the same constitution as the first embodiment, a stationary shoulder 5a of a first friction stir welding tool 3a disposed at the corner c1 includes an end formed in an obtuse chevron shape by the face P1 of the first workpiece W1 and a lateral surface P2a of the second workpiece W2.

A probe 4a of the first friction stir welding tool 3a is disposed in a posture of making an angle at which a direction of the central axis thereof is parallel to a bisector of an angle of the corner c1 within the yz plane.

A stationary shoulder 5b of a second friction stir welding tool 3b disposed at the corner c2 includes an end formed in an acute chevron shape by the face P1 of the first workpiece W1 and a lateral surface P2b of the second workpiece W2.

A probe 4b of the second friction stir welding tool 3b is disposed in a posture of making an angle at which a direction of the central axis thereof is parallel to a bisector of an angle of the corner c2 within the yz plane.

Therefore, in the present embodiment, a p-axial direction that is a direction following the direction of the central axis of the probe 4a within the yz plane, a q-axial direction that is a direction orthogonal to the p-axial direction, an r-axial direction that is a direction following the direction of the central axis of the probe 4b within the yz plane, and an s-axial direction that is a direction orthogonal to the r-axial direction are disposed at angles as shown in FIG. 15.

For this reason, in the friction stir welding device of the present embodiment, although not shown, in the same constitution as the welding device main body 2 shown in FIGS. 5 to 9, a first spindle unit 7a may be disposed in a posture of making an angle following the p-axial direction of FIG. 15, and a second spindle unit 7b may be disposed in a posture of making an angle following the r-axial direction of FIG. 15.

Further, a first axially perpendicular movement unit 11 may be disposed at an angle at which the first spindle unit 7a can be moved in the q-axial direction shown in FIG. 15, and a first axial movement unit 12 may be disposed at an angle at which the first spindle unit 7a can be moved in the p-axial direction shown in FIG. 15.

A second axially perpendicular movement unit 13 may be disposed at an angle at which the second spindle unit 7b can be moved in the s-axial direction shown in FIG. 15, and a second axial movement unit 14 may be disposed at an angle at which the second spindle unit 7b can be moved in the r-axial direction shown in FIG. 15.

A workpiece holder 1 may be configured such that the end pressing members 67a and 67b of the workpiece table 59 shown in FIGS. 11A and 11B have a constitution in which the longitudinal plate 69 is inclined along the second workpiece W2.

Further, in the same constitution shown in FIGS. 12 and 13, a workpiece clamping unit 62 may include side clamping rollers 86a to 86f at symmetrical positions between which the second workpiece W2 is sandwiched, and be configured to incline top clamping rollers 88a and 88b along a surface of the second workpiece W2.

The other constitutions may be the same as the first embodiment.

According to the friction stir welding device of the present embodiment, the friction stir welding device is used in the same way as the first embodiment, and thereby the two corners c1 and c2 between the first workpiece W1 and the second workpiece W2 that is butted in a posture of making an angle other than 90° can be subjected to friction stir welding, so that the same effects as in the first embodiment can be obtained.

Third Embodiment

Figure 16A:
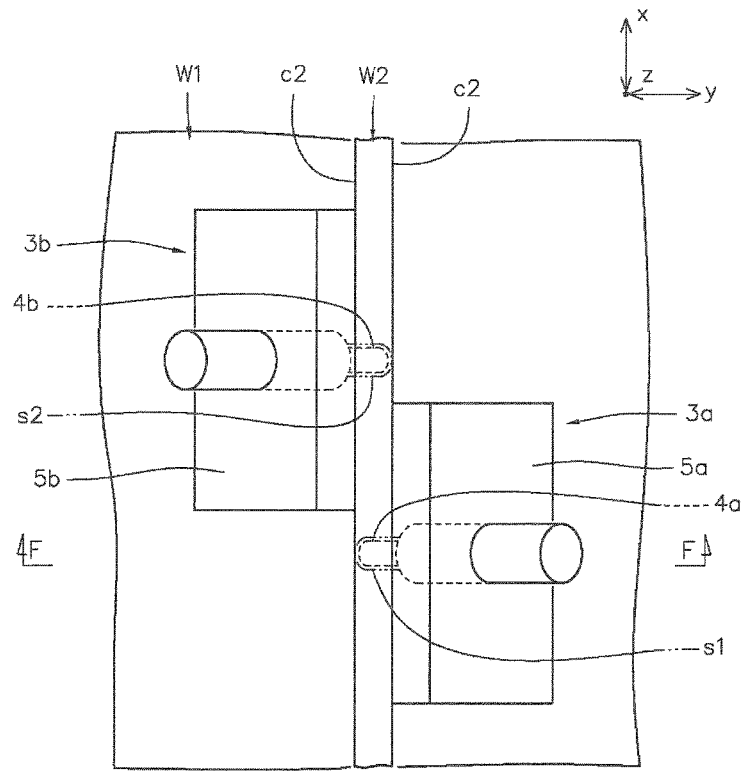
FIG. 16A is an enlarged top view showing a third embodiment of the friction stir welding device and portions of friction stir welding tools.
Figure 16B:
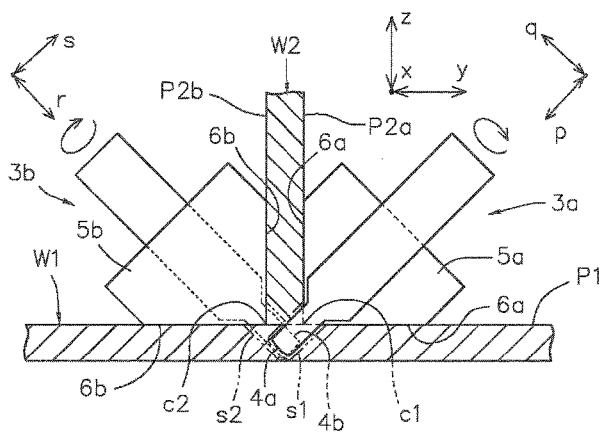
FIG. 16B is a view that shows the third embodiment of the friction stir welding device and is taken in the directions of arrows F-F of FIG. 16A.

FIGS. 16A and 16B are views showing a third embodiment of the friction stir welding device, wherein FIG. 16A is an enlarged top view showing the portions of the friction stir welding tools, and FIG. 16B is a view taken in the directions of arrows F-F of FIG. 16A.

In FIGS. 16A and 16B, parts same as those shown in FIGS. 4A and 4B will be given the same reference signs, and a description thereof will be omitted.

In place of the constitution in which the positions of the first and second friction stir welding tools 3a and 3b in the x-axial direction are aligned and disposed in the same constitution as the first embodiment, a friction stir welding device of the present embodiment is configured such that probes 4a and 4b of the first and second friction stir welding tools 3a and 3b are disposed by shifting positions thereof in the x-axial direction as shown in FIG. 16A.

As shown in FIG. 16B, in the friction stir welding tools 3a and 3b, amounts of protrusion of the probes 4a and 4b from stationary shoulders 5a and 5b are set to have arrangement in which stir regions s1 and s2 due to the probes 4a and 4b retracted thereinto interfere with each other, that is, to enable the workpieces W1 and W2 to be subjected to entire stir welding.

In this case, a configuration in which x-axial positions of the spindle units 7a and 7b on which the friction stir welding tools 3a and 3b are mounted are shifted from each other may be adopted in the welding device main body 2 shown in FIGS. 5 to 9.

Although not shown, this constitution can be realized in such a way in that, for instance, in a case in which a distance of the probe 4a from the frame 10 (see FIG. 5) is set to be greater than a distance of the probe 4b from the frame 10, either a thickness of a first axially perpendicular movement unit 11 in the x-axial direction is increased as compared to a second axially perpendicular movement unit 13 or a thickness of a first axial movement unit 12 in the x-axial direction is increased as compared to a second axial movement unit 14 in the same constitution as the welding device main body 2 shown in FIGS. 5 to 9.

Alternatively, the aforementioned constitution can also be realized in such a way in that a shim plate having a desired thickness in the x-axial direction is also interposed in any place in which the first axially perpendicular movement unit 11 is mounted on the frame 10, a place in which the first axial movement unit 12 is mounted on the first axially perpendicular movement unit 11, and a place in which the first spindle unit 7a is mounted on the first axial movement unit 12.

Further, the aforementioned constitution can be also realized by a constitution in which the frame 10 itself has an x-axial step at the mounted place of the first axially perpendicular movement unit 11 and the mounted place of the second axially perpendicular movement unit 13.

The other constitutions may be the same as the first embodiment.

According to the friction stir welding device of the present embodiment, the friction stir welding device is used in the same way as the first embodiment, and thereby the two corners c1 and c2 between the first workpiece W1 and the second workpiece W2 can be subjected to friction stir welding.

As in the first embodiment, effects of, for instance, improving controllability of pressing loads applied to the friction stir welding tools 3a and 3b can be obtained.

The present disclosure is not limited only to each of the embodiments, and the friction stir welding tools 3a and 3b may be configured such that the directions of the central axes of the probes 4a and 4b are not necessarily matched with the directions of the bisectors of the angles of the corners c1 and c2 to be welded.

The friction stir welding tools 3a and 3b may be configured such that the directions of the central axes of the probes 4a and 4b are inclined in the advancing direction (the x-axial direction) of the friction stir welding.

In the stationary shoulders 5a and 5b, if the workpiece contact faces 6a and 6b brought into contact with the surfaces of the workpieces W1 and W2 at both sides of the corners c1 and c2 to be welded have the chevron shape, the other portions may be formed in shapes other than the shown shape.

If the first axially perpendicular movement unit 11 is configured to enable the spindle unit 7a to be moved in the q-axial direction, the constitution thereof may be a constitution other than the shown constitution. For example, as the linear motion mechanism for moving the movable table 18, a linear motion mechanism other than the ball screw mechanism 19, such as a rack and pinion type or an actuator, may be used.

The arrangement of the linear motion mechanism, the number or arrangement of the guide rails 16, the number or arrangement of the guide blocks 17, the shape of the baseplate 15 or the movable table 18, the arrangement of the gas spring 25, and so on, may be freely changed.

If the first axial movement unit 12 is configured to enable the spindle unit 7a to be moved in the p-axial direction, the constitution thereof may be a constitution other than the shown constitution. For example, as the linear motion mechanism for moving the movable table 29, a linear motion mechanism other than the ball screw mechanism 30, such as a rack and pinion type or an actuator, may be used. The arrangement of the linear motion mechanism, the number or arrangement of the guide rails 27, the number or arrangement of the guide blocks 28, the shape of the baseplate 26 or the movable table 29, and so on, may be freely changed.

If the second axially perpendicular movement unit 13 is configured to enable the spindle unit 7b to be moved in the s-axial direction, the constitution thereof may be a constitution other than the shown constitution like the first axially perpendicular movement unit 11.

If the second axial movement unit 14 is configured to enable the spindle unit 7b to be moved in the r-axial direction, the constitution thereof may be a constitution other than the shown constitution like the first axial movement unit 12.

If the gravity compensation mechanism of the axially perpendicular movement units 11 generates a force for supporting q-axial components of weights of the movable table 18 itself and the device moving along with the movable table 18, a gravity compensation mechanism of an arbitrary type other than the gas spring 25, such as a constant load spring or another spring, a cylinder, or a counter weight, may be adopted.

Similarly, the gravity compensation mechanism of the axially perpendicular movement units 13 generates a force for supporting s-axial components of weights of the movable table 40 itself and the device moving along with the movable table 40, a gravity compensation mechanism of an arbitrary type other than the gas spring 47, such as a constant load spring or another spring, a cylinder, or a counter weight, may be adopted.

The welding device main body 2 may be configured to hold the first spindle unit 7a via the first axial movement unit 12 mounted on the frame 10 and the first axially perpendicular movement unit 11 mounted on the first axial movement unit 12, and to hold the second spindle unit 7b via the second axial movement unit 14 mounted on the frame 10 and the second axially perpendicular movement unit 13 mounted on the second axial movement unit 14.

If the driving means 61 is configured to enable the workpiece table 59 to be moved in the x-axial direction, the constitution thereof may be a constitution other than the shown constitution. For example, the driving means 61 may use a constitution having the racks at the pedestal 9 side and the rotatable pinion gears at the workpiece table 59 side, or either a ball screw mechanism or an actuator.

The control device 97 may include only any one of the load-dependent control mode and the no-control mode as the control mode of each of the axially perpendicular movement units 11 and 13 besides the positioning control mode. The control device 97 may further include another control mode as the control mode of each of the axially perpendicular movement units 11 and 13.

When the control device 97 does not include the no-control mode with respect to each of the axially perpendicular movement units 11 and 13, the gravity compensation mechanism may be omitted.

The control device 97 may include only any one of the pressing load-dependent control mode and the spindle torque-dependent control mode as the control mode of each of the axial movement units 12 and 14 besides the positioning control mode. The control device 97 may further include another control mode as the control mode of each of the axial movement units 12 and 14.

The xy plane within which the face P1 of the first workpiece W1 is disposed may be inclined rather than the horizontal plane. In this case an angle of the three-dimensional orthogonal coordinate system used to describe the constitution of the aforementioned device may be changed on the basis of the xy plane.

When the friction stir welding is performed, the method called AdStir disclosed in Non-Patent Literature 1 may be applied.

In this case, in the constitution identical to that shown in FIGS. 4A and 4B or FIG. 15, each of the friction stir welding tools 3a and 3b may be configured such that an apex of the chevron shape formed by the workpiece contact faces 6a and 6b of each of the stationary shoulders 5a and 5b has a notch for inserting a welding filler at a front side thereof in the advancing direction of the friction stir welding, and such that each of the welded corners c1 and c2 has a notch of a shape corresponding to a desired fillet at a rear side thereof in the advancing direction of the friction stir welding.

The friction stir welding device of the present disclosure may have a type in which the workpiece table 59 for holding the first and second workpieces W1 and W2 is fixed, the moving means is provided for the welding device main body 2, and the welding device main body 2 is moved in the direction in which each of the corners c1 and c2 extends.

In addition, it is needless to say that various modifications can be added without departing from the gist of the present disclosure.

INDUSTRIAL APPLICABILITY

According to the present disclosure, the controllability of the pressing loads of the friction stir welding tools can be improved.

What is claimed is:

1. A friction stir welding device comprising:
a workpiece holder configured to hold a first workpiece and a second workpiece whose end edge is butted and disposed in a posture making an angle intersecting a face of the first workpiece; and
a welding device main body configured to be relatively moved in directions in which corners formed by the first and second workpieces held by the workpiece holder extend,
wherein the welding device main body includes:
friction stir welding tools including stationary shoulders, which have workpiece contact faces brought into contact with both of the workpieces forming the corners, and rotatable probes and disposed at both the corners between which the second workpiece is sandwiched;
spindle units configured to rotate the probes of the friction stir welding tools;
axial movement units configured to move the spindle units in directions following rotary shafts of the probes within a plane perpendicular to a direction of relative movement of the welding device main body relative to the workpieces; and
axially perpendicular movement units configured to move the spindle units in directions perpendicular to the rotary shafts of the probes within the plane perpendicular to the direction of relative movement, and
wherein the axially perpendicular movement units include:
movable tables that are moved in the directions perpendicular to the rotary shafts of the probes within the plane perpendicular to the direction of relative movement; and
gravity compensation mechanisms that are mounted on the movable tables.

2. The friction stir welding device according to claim 1, wherein:
the axial movement units include movable tables that are moved in the directions following the rotary shafts of the probes within the plane perpendicular to the direction of relative movement of the welding device main body relative to the workpieces, and linear motion mechanisms that move the movable tables; and
the linear motion mechanisms include, along with a positioning control mode of instructing a targeted position to perform movement, at least one control mode of a pressing load-dependent control mode depending on pressing loads applied to the friction stir welding tools, and a spindle torque-dependent control mode depending on spindle torques needed to rotate the probes of the friction stir welding tools.

3. The friction stir welding device according to claim 1, wherein:
the axially perpendicular movement units include linear motion mechanisms that move the movable tables; and
the linear motion mechanisms include, along with a positioning control mode of instructing the targeted position to perform the movement, at least one control mode of a no-control mode and a load-dependent control mode according to loads applied between the linear motion mechanisms and the movable tables.

* * * * *